United States Patent [19]

Matsuno et al.

[11] Patent Number: 4,685,989
[45] Date of Patent: Aug. 11, 1987

[54] PROCESS AND APPARATUS FOR PRODUCING WELDED CAN BODY WITH AN ORGANIC COATED WELDED PART

[75] Inventors: Kenji Matsuno; Hisakazu Yasumuro, both of Yokohama; Kazuo Taira, Tokyo; Tsuneo Imatani, Yokosuka; Makoto Toyoshima, Tokyo, all of Japan

[73] Assignee: Toyo Seikan Kaisha Limited, Tokyo, Japan

[21] Appl. No.: 783,381

[22] PCT Filed: Jan. 25, 1985

[86] PCT No.: PCT/JP85/00029
§ 371 Date: Sep. 24, 1985
§ 102(e) Date: Sep. 24, 1985

[87] PCT Pub. No.: WO85/03252
PCT Pub. Date: Aug. 1, 1985

[30] Foreign Application Priority Data

Jan. 25, 1984 [JP] Japan .................. 59-10300
Sep. 27, 1984 [JP] Japan .................. 59-200512
Dec. 27, 1984 [JP] Japan .................. 59-273746

[51] Int. Cl.$^4$ .................................... B29C 63/00
[52] U.S. Cl. ........................ 156/244.13; 156/287; 156/293; 156/309.9; 156/321; 156/521; 156/567; 413/77; 493/276; 493/292

[58] Field of Search ............ 118/DIG. 10; 156/203, 156/218, 287, 294, 309.9, 320, 321, 322, 244.13, 500, 521, 567, 293; 413/19, 77; 493/276, 292

[56] References Cited

U.S. PATENT DOCUMENTS

| 2,795,264 | 6/1957 | Pechy ................. 413/77 X |
| 3,260,636 | 7/1966 | Witzenmann ......... 156/203 |
| 3,893,882 | 7/1975 | Repenning .......... 156/287 |
| 3,898,945 | 8/1975 | Rohowetz ........ 156/218 X |
| 4,346,814 | 8/1982 | Rentmeester ...... 156/218 X |
| 4,477,298 | 10/1984 | Bohannon et al. .... 156/203 X |

FOREIGN PATENT DOCUMENTS 671736 10/1963 Canada .................. 413/77

Primary Examiner—Robert A. Dawson
Attorney, Agent, or Firm—Wenderoth, Lind and Ponack

[57] ABSTRACT

A process and an apparatus for producing a welded can body having an organic coated welded part are provided in which the exposed metal portion on the inside of the welded part of the can body and its vicinity is covered with a tape of an organic resin alone or a mixture of an organic resin with an inorganic material such as a pigment, a metal, etc. The resin tape is entirely supported by a mandrel to be disposed inside the can body, and pressed against the inside surface of the welded part and its vicinity. By heating the welded part of the can body, the resin tape is heated during pressing.

15 Claims, 20 Drawing Figures

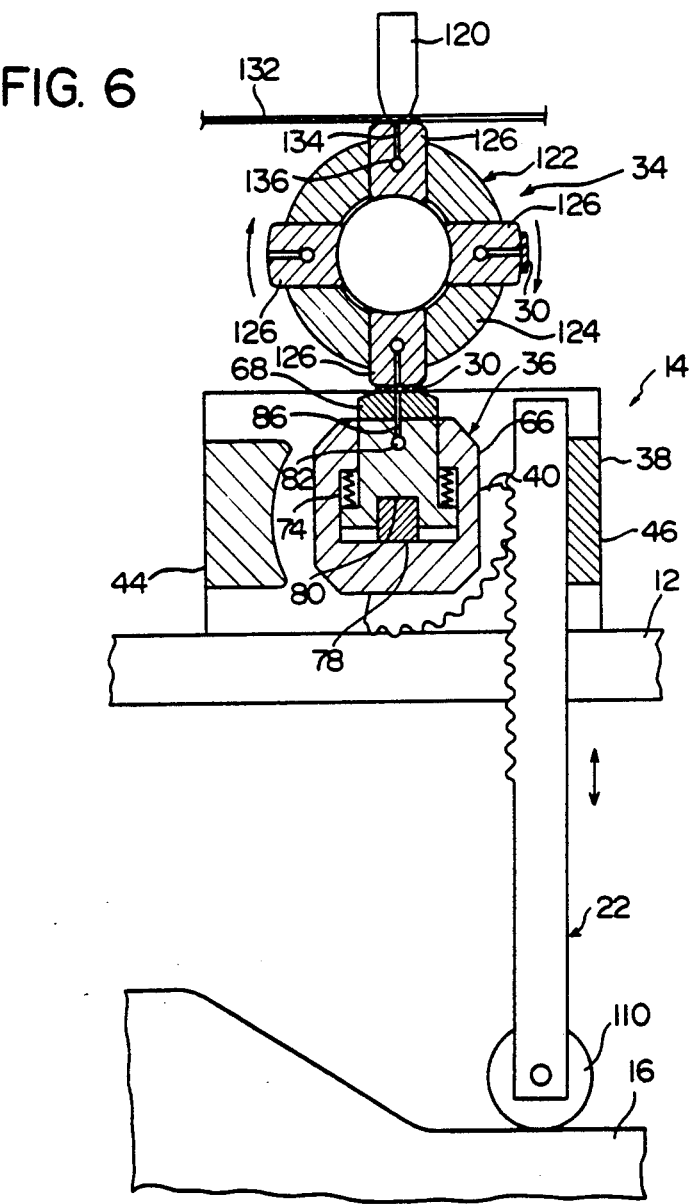

PROCESS AND APPARATUS FOR PRODUCING WELDED CAN BODY WITH AN ORGANIC COATED WELDED PART

TECHNOLOGICAL FIELD

This invention relates to a process and an apparatus for producing a welded can body having an organic coated welded part. More specifically, it relates to a process and an apparatus for producing a welded can body having an organic coated welded part in which the exposed metal portion at the welded part or its vicinity is covered with an organic resin or an organic resin composition comprising an inorganic material such as a pigment, metal, etc.

BACKGROUND TECHNOLOGY

Heretofore, the following methods have been proposed for organic coating of the welded part, i.e. the exposed metal portion.

Firstly, a method has been proposed which comprises coating a liquid paint on the exposed metal portion by spraying or roll coating, and drying and curing it by heating thereby to coat the welded part. By this first method, it is difficult to form a coated film of a uniform thickness along the shape of the welded part, and it has the disadvantage that to prevent the exposure of the metal completely, the coated film undesirably thicker becomes in part. The thick portion tends to foam during heating and result in the formation of pores. To prevent foaming, the heating time should be prolonged, and the solvent should be evaporated slowly. This is uneconomical and undesirable.

Secondly, a method has been proposed which comprises coating a synthetic resin powder on the exposed metal portion of the welded part by electrostatic coating. The second method, however, has the defect that pores tend to form, and a problem is liable to arise in the film forming ability of the resin.

Thirdly, a method has been proposed which comprises providing a nozzle for injecting a molten resin in proximity to the exposed metal portion, moving the nozzle and a can body relative to each other, injecting the molten resin in a tape form, and successively adhering it to the exposed metal portion, thereby to organic-coat the welded part, as disclosed in U.S. Pat. No. 3,077,171, particularly FIG. 7 thereof. According to the third method, it is necessary to carry the molten resin as far as the tip of the welding roll electrode in a welding machine and form a film of the resin on the exposed metal portion so that it continuously has a uniform width and thickness. This requires a sophisticated technique, and involves difficult maintenance.

Fourthly, a method has been proposed which comprises providing a roll within a can body, and successively press-adhering a tape-like resin to the exposed metal portion thereby to organic-coat the welded part, as disclosed in U.S. Pat. No. 3,077,171, particularly FIG. 6 thereof, and Japanese Laid-Open Patent Publication No. 17224/1981. According to the fourth method, it is technically difficult to carry the tape-like resin to the tip of the welding roll electrode, for example, and to cut it to a length corresponding to the length of the can. In other words, the fourth method has the disadvantage that it is difficult to adjust the tape-like resin accurately to the desired size, and to apply it accurately to the desired position. This disadvantage is remarkable especially when the can body has a small inside diameter. Furthermore, since the fourth method normally uses rolls made of an elastic material such as rubber and having a restricted outside diameter, the rolls disadvantageously undergo marked wear. According to this method, the tape-like resin should be pressed by the roll under a relatively strong pressure along the surface of the welded part. This leads to the inherent practical defect that the tape-like resin extends in a zig-zag fashion and is not properly adhered, and the support used for supporting the roll shakes to give rise to various problems.

The fourth method further has the following problems.

Firstly, to adhere the tape-like resin to the welded part of the can body with a sufficient adhesion strength, it is necessary to heat the welded portion of the metallic can body to a relatively high temperature (for example, at least 100° C. above the softening point) and to press the tape-like resin against the welded part. At this time, the tape-like resin is melted by the heat from the welded part and can flow so as to fill the stepped portion in the welded part. Since, however, the tape-like resin is usually still at a relatively high temperature (for example, at least 20° C. above the softening temperature) when the welded part kept at such a relatively high temperature to secure adhesive strength adheres to the tape-like resin by a roll-like pressing member and they leave the pressing member, namely when the presssure between the tape-like resin and the welded part is released, bubbles are liable to form in the tape-like resin after releasing the pressure. At the organic coated welded part in which bubbles are so formed, desirable corrosion resistance is difficult to obtain.

Secondly, to prevent formation of bubbles at the tape-like resin, it is necessary to lower the heating temperature at the welded part so that the temperature of the tape-like resin at the time when the welded part and the tape-like resin leave the roll-like pressing member can be lowered to below the softening temperature of the tape-like resin plus 20° C. However, satisfactory organic coating of the welded part cannot be obtained at this time because the strength of adhesion between the welded part of the can body and the tape-like resin is low and the tape-like resin cannot flow sufficiently to fill the stepped portion in the welded part.

Furthermore, when the welded part is pre-heated as above, variations in heating temperature occur in the organic coated welded portion of the can body, and tend to result in the formation of bubbles or in variations in adhesion strength.

Thirdly, in the method disclosed in the abovecited Japanese Laid-Open Patent Publication No. 17224/1981, after application of the tape-like resin, the welded part of the can body is primarily heated to a relatively low temperature that does not cause formation of the tape-like resin, and the tape-like resin is pressed against the welded part with rolls to adhere it preliminarily. Thereafter, the welded part of the can body is secondarily heated to cause the tape-like resin to flow so that it completely fills the stepped portion in the welded part and also to increase the strength of adhesion between the can body and the tape-like resin. However, since the tape-like resin is not pressed at the time of the secondary heating, abrupt heating or heating to high temperatures will cause formation of bubbles in the tape-like resin. For this reason, the secondary heating time becomes longer (for example, 10 to 15 seconds or longer), and other devices are required for temperature control.

On the other hand, because the third and fourth methods use an extruded resin or tape-like resin, they are better than the first and second methods in that (a) they can form a coated film which is relatively uniform and free from pores.

As stated above, however, these methods have various problems to be solved, which arise when a correction material such as a tape-like resin is applied to the welded part of the can body.

The present invention has been made in view of the aforesaid background.

It is an object of this invention to provide a process and an apparatus for producing a welded can body having a properly organic coated welded part, in which the exposed metal portion of the inside of the welded part of the welded can body and its vicinity is properly protected.

Another object of this invention is to provide a new process and apparatus for producing a welded can body having an organic coated welded part in which a tape-like resin is used.

Another object of this invention is to provide a process and an apparatus for producing a welded can body having an organic coated welded part, in which a tape-like resin is accurately adhered to the exposed metal portion without formation of bubbles in the resin.

Another object of this invention is to provide a process and an apparatus for producing a welded can body having an organic coated welded part in which a tape-like resin of an accurately adjusted size is applied to the exposed metal portion at an accurate position.

Another object of this invention is to provide a process and an apparatus for producing a welded can body having an organic coated welded part in which a tape-like resin is applied to the exposed metal portion within a short period of time.

DISCLOSURE OF THE INVENTION

According to this invention, there is provided a process for producing a welded can body having an organic coated welded part, which comprises a placing step of placing a tape-like resin having a length corresponding to the body length of a welded can body on a mandrel, a mounting step of mounting the welded can body on the mandrel, a heating step of heating the tape-like resin, an adhering step of adhering the tape-like resin to the welded part of the welded can body while the mandrel having the tape-like resin placed thereon is pressed against the welded can body, a releasing step of releasing the pressure between the mandrel and the welded can body after the adhesion, and a carrying step of carrying the welded can body having the tape-like resin adhered to the welded part from the mandrel.

In one embodiment of this process, the welded part of the can body is heated before the adhering step, and thereby the tape-like resin is heated. According to this embodiment, the heating time can be prolonged, and the tape-like resin can be cooled while it is pressed. Accordingly, at a time when the pressurization between the tape-like resin and the welded part of the can body is released, the temperature of the tape-like resin becomes relatively low (for example, lower than the softening temperature plus 20° C.), and formation of bubbles in the tape-like resin is reduced. Furthermore, since the pressurization time can be prolonged, the tape-like resin can be deformed and properly fill the stepped portion in the welded part.

In another embodiment of this process, the welded part of the can body is heated during the adhering step, and thereby the tape-like resin is heated. For this reason, there is no particular need to keep the welded part at a high temperature, nor is there a problem of discoloration of a printing ink, and the temperature control is relatively easy. Furthermore, since the tape-like resin is in intimate press contact with the welded part of the can body during heating, the heat conduction from the welded part to the tape-like resin is good and the thermal efficiency is high. Moreover, escape of air from the stepped portion in the welded part is good, and the adhesive temperature can be made uniform. Thus, the adhesive strength can be rendered uniform throughout the tape-like resin.

According to another embodiment of this process, the welded part of the can body is heated before the mounting step and further during the adhering step, whereby the tape-like resin is heated. According to this embodiment, the pressurization and heating times can be shortened as compared with the aforesaid embodiments.

According to this invention, there is also provided a process for producing a welded can body having an organic coated welded part, which comprises a mounting step of mounting a welded can body on a mandrel having a groove formed in a contacting portion; an adhering step of bringing the contacting portion of the mandrel into contact with the inner wall of the welded can body, forming the desired sealed space by the inside surface of the welded part and its vicinity to be organic coated and the groove of the mandrel and injecting a molten resin into this sealed space thereby to adhere the resulting tape-like resin to the welded part of the can body; and a separating step of separating the welded can body from the mandrel.

In this process, the molten resin is supplied to the welded part of the can body and a tape-like resin adhered to the welded part of the can body is formed. This can ensure accurate filling of the stepped portion in the welded part.

According to this invention, there is also provided a process for producing a welded can body having an organic coated welded part, which comprises a first step of heating a tape-like resin to a point at least 25° C. above the softening temperature while it is pressed against the inside of the welded part of a welded can body, a step of cooling the tape-like resin to a temperature below the softening temperature plus 20° C. while maintaining the pressed state after the first step, and a third step of releasing the pressed state after the second step.

In this process, the tape-like resin is adhered to the welded part of the can body under optimal temperature conditions, and the formation of bubbles in the tape-like resin is reduced. Furthermore, the tape-like resin fully fills the stepped portion in the welded part, and can be adhered to the welded can body with a good adhesion strength.

According to this invention, there is also provided an apparatus for producing a welded can body having an organic coated welded part, comprising a rotatably provided rotating plate and a plurality of adhering devices fixed to the rotating plate, each of the adhering devices having a mandrel to be disposed within a can body loaded into the adhering device, said mandrel including a holding portion for holding a tape-like resin, and said holding portion being disposed such that it can move between a position at which it approaches the inside surface of the can body loaded in the adhering device and a position at which it is apart from said inside surface.

In this apparatus, the plurality of mandrels are provided on the rotating plate. Hence, tape-like resins can be adhered successively to the inside surfaces of the welded parts of many can bodies. Furthermore, by the holding portion holding the tape-like resin, the tape-like resin can be pressed against the welded part of the can body with a uniform pressing force.

According to this invention, there is also provided an apparatus for producing a welded can body having an organic coated welded part, comprising a rotatably provided rotating plate and a plurality of adhering devices fixed to the rotating plate, each of the adhering devices having a mandrel to be disposed within a can body loaded into the adhering device, said mandrel including a holding portion which is disposed such that it can move beween a position at which it makes contact with the inside surface of the can body loaded into the adhering device and a position at which it is apart from said inside surface, and said holding portion having provided therein a groove which when the holding portion is at said contacting position, forms a sealed space conforming to the desired tape shape together with the inside surface of the welded part of the can body loaded into the adhering device.

In this apparatus, the plurality of mandrels are provided in the rotating plate, and the tape-like resin can be succesively formed from the molten resin and placed on the inside surface of the welded part of the can body.

According to this invention, there is also provided an apparatus for producing a welded can body having an organic coated welded part, comprising a rotating plate provided rotatably on a supporting member, a plurality of adhering devices provided on the rotating plate, each of the adhering devices including a holding member for holding an orgnaic coating material, a pressing member for pressing the organic coating material held by the holding member against the welded part of the can body and an opposing member for applying a force opposing the pressing force of the pressing member, said apparatus further comprising a temperature adjusting device provided on the supporting member independently from the rotating plate for adjusting the temperature of the coating material.

This apparatus has on the rotating plate a member for applying a force opposing the pressing force of the pressing member, and by these, the coating material such as a tape-like resin is pressed against the inside surface of the welded part of the can body. Hence, a device for adjusting temperature such as a heater, etc. can be provided independently of the rotating plate.

BRIEF DESCRIPTION OF THE DRAWINGS

FIG. 6 is a sectional view of the adhering device positioned at a transferring position (a position in the lower portion in FIG. 1) and a transferring device, etc. cooperating with it in the apparatus in accordance with the first embodiment of the invention.

BEST MODE OF PRACTICING THE INVENTION

First Embodiment (Construction)

With reference to FIGS. 1 to 9, the first embodiment of the invention will be described.

Figure 1:
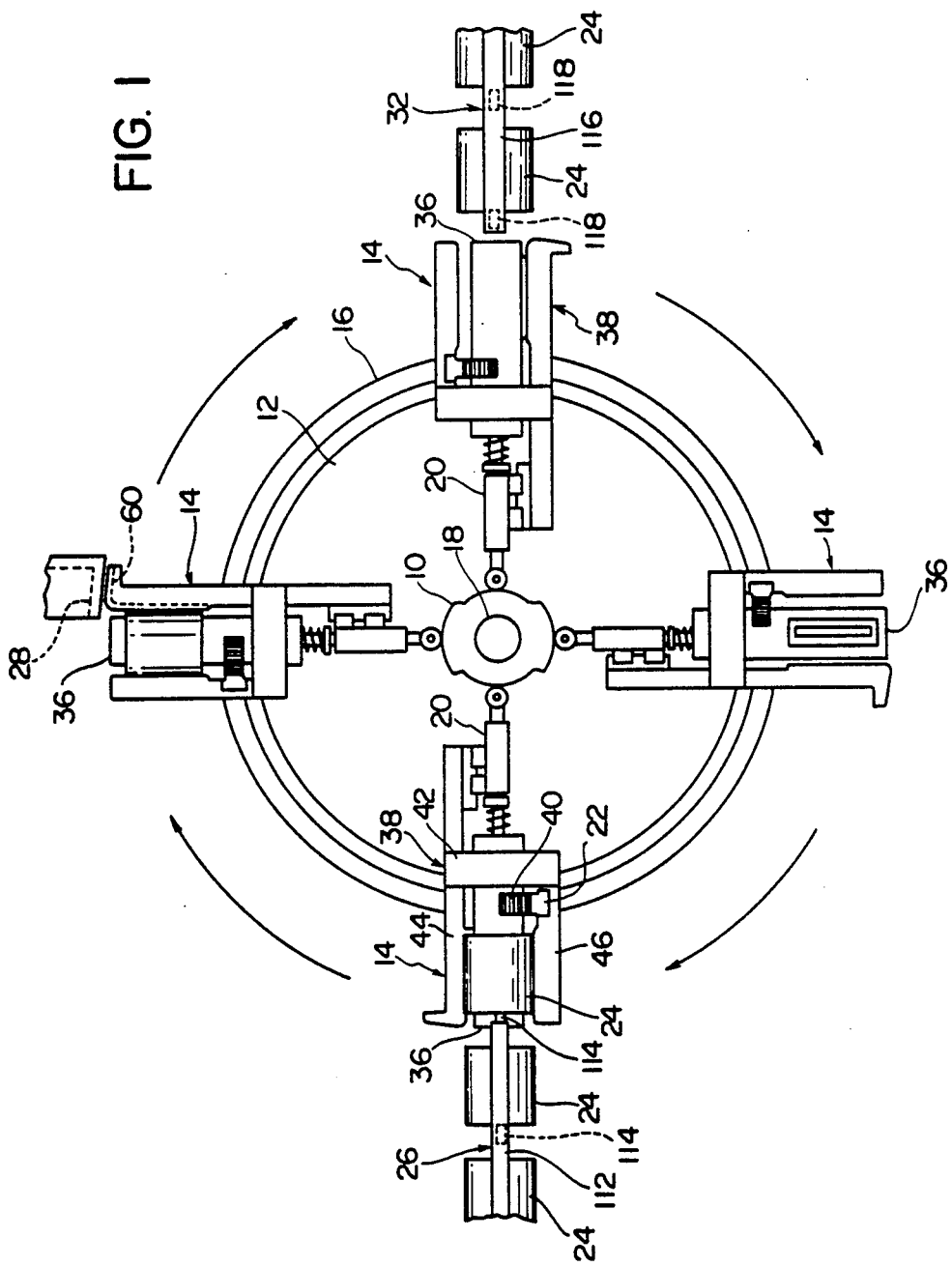
FIG. 1 is a top plan view of an apparatus in accordance with a first embodiment of the present invention.

The apparatus shown in FIG. 1 includes a central stationary cam 10, a disc-like rotating plate 12, four adhering devices 14 and a cylindrical rib cam 16.

The central stationary cam 10 is fixed to a fixed shaft 18, The periphery of the central stationary cam 10, as shown in FIG. 1, is divided into four nearly equal portions, and raised and depressed portions are arranged alternately.

The rotating plate 12 is supported rotatably about the fixed shaft 18, and adapted to be rotated intermittently by an angle of 90° by a driving device not shown.

The four adhering devices 14 are fixed to the rotating plate 12 at equiangular intervals. Each of the adhering devices 14 has a first cam follower 20 adapted to engage the central stationary cam 10. The details of the adhering device 14 will be described hereinafter.

The cylindrical rib cam 16 is provided fixedly on a securing member exteriorly of the rotating plate 12. It has raised and depressed portions axially of the fixed shaft 18 and is adapted to actuate a second cam follower 22 (FIGS. 4 to 6) of the adhering device 14.

Each of the adhering devices 14 is successively held at the following four operating positions. First, at a loading position on the left side of FIG. 1, a can body 24 formed from a plate-like blank by a welding device (not shown) is loaded into the adhering device 14 by a delivery device 26. At an adhering position on top of FIG. 1, an electromagnetic energy is supplied through a primary high frequency coil 28 to heat the welded part of the can body 24. A tape-like resin 30 (FIG. 3) is pressed against the welded part and thus adhered. At a carrying position on the right side in FIG. 1, the can body 24 is carried away from the adhering device 14 by a carrying device 32. At a transferring position at the bottom of FIG. 1, the tape-like resin 30 is placed on a mandrel 36 of the adhering device 14 by a transferring device 34 (FIG. 6).

With reference to FIGS. 2 to 5, the adhering device 14 will be described in detail.

Figure 2:
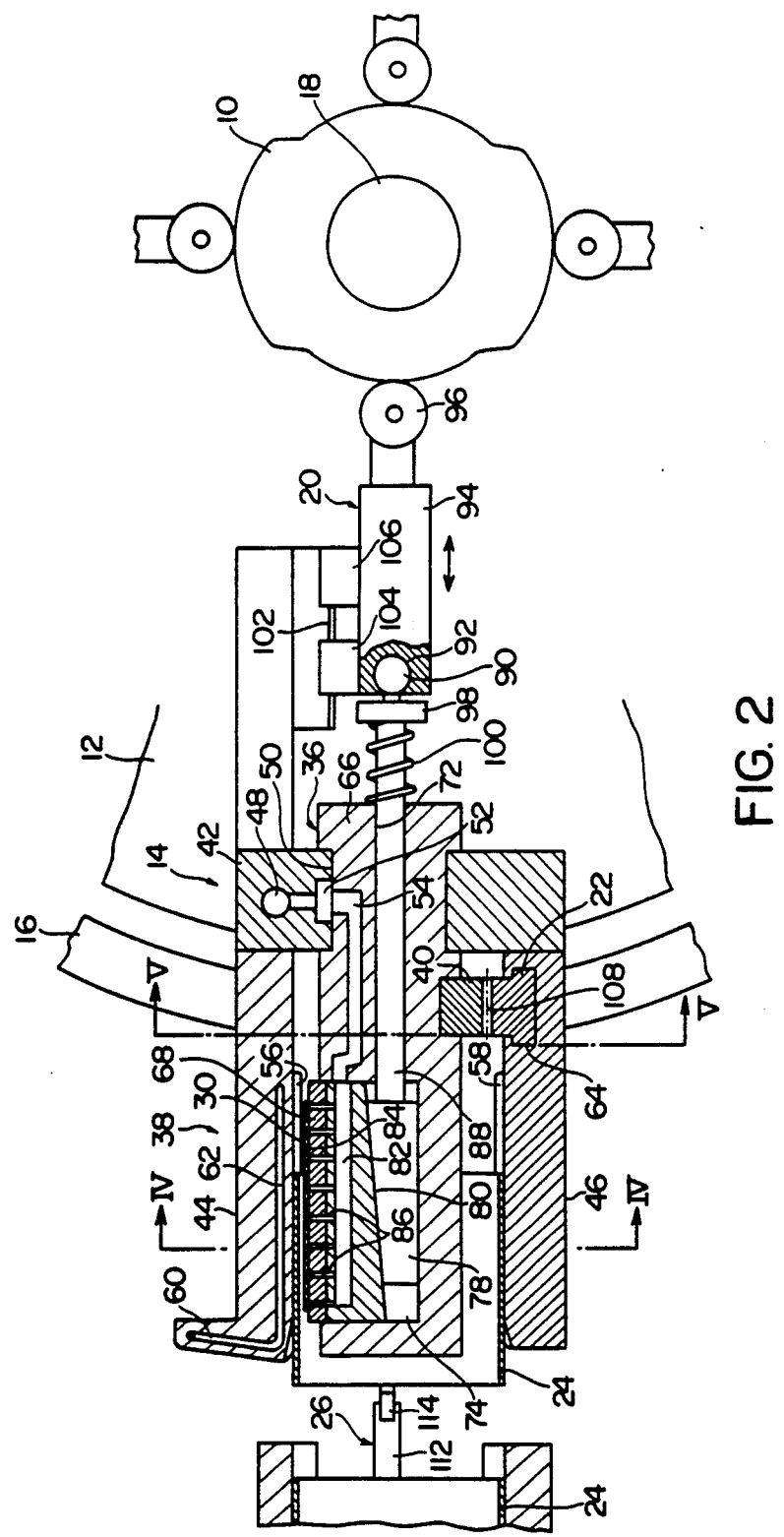
FIG. 2 is an enlarged top plan view showing part of the apparatus of FIG. 1 in section.

FIG. 2 shows the adhering device 14 at the loading position. The adhering device 14 includes a frame 38 fixed to the rotating plate 12, the mandrel 36 rotatably mounted on the frame 38, a first cam follower 20 extending into the inside of the mandrel 36 and a second cam follower 22 adapted to engage a partial gear 40 of the mandrel 36.

Figure 3:
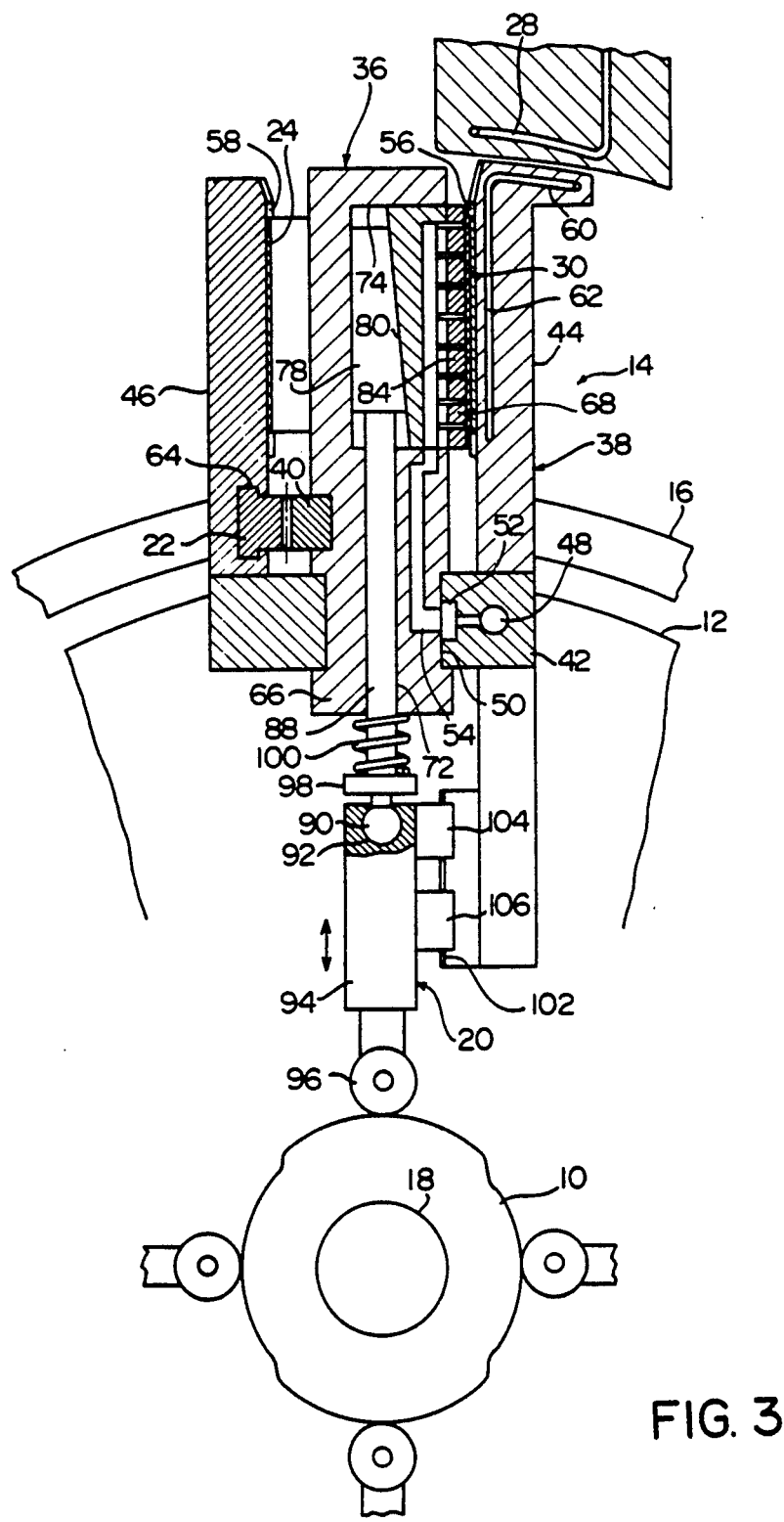
FIG. 3 is an enlarged top plan view showing another part of the apparatus of FIG. 1 in section.

The frame 38 is comprised of a bottom plate 42 fixed to the rotating plate 12, and two side plates 44 and 46 extending nearly radially of the disc-like rotating plate 12 to which the bottom plate 42 is fixed. A communication hole 48 communicating with a vacuum source (not shown) via a control device (not shown) is formed in the bottom plate 42. The communication hole 48 is adapted to communicate selectively with the atmosphere and the vacuum source by the control device. Also formed in the bottom plate 42 is a cylindrical opening 50 through which the mandrel 36 extends. The mandrel 36 is disposed within the opening 50 so that it can rotate with a predetermined angular range but cannot move axially (in the left-right directions in FIG. 2). A groove 52 circumferentially extending over a predetermined angular range is formed in the inner wall of the cylindrical opening 50 of the bottom plate 42, and communicates with the communication hole 48. As a result, the communication hole 48 always communicates with a connection hole 54 formed in the mandrel 36 at all angular positions within the rotatable range of the mandrel 36. The side plates 44 and 46 have inner walls 56 and 58 partly forming a cylindrical shape conforming to the outside shape of the can body 24 to be inserted, and by this, the can body 24 can be held at a predetermined position. On the other hand, a secondary high frequency coil 60 and a heating coil 62 connected to it are disposed within the other side plate 44. The heating coil 62 is disposed so that it opposes the can body 24 at least along its entire length in the axial direction thereof when the can body 24 is set at a predetermined position within the adhering device 14 (FIG. 3). Thus, at the adhering position shown in FIG. 3, an electromagnetic energy is supplied to the secondary high frequency coil 60 from the primary high frequency coil 28. An electric current flows through the heating coil 62 and an electromagnetic field is generated around the heating coil 62. By this electromagnetic field, an electric current flows in the vicinity of the welded part of the can body 24 facing the heating coil 62 and it is heated over its entire length. The inside of the heating coil 62 is adapted to permit circulation of cooling water to prevent heating of the coil. The other side plate 46 has a groove 64 formed therein for receiving the second cam follower 22 such that the cam follower 22 can move longitudinally (vertically in FIG. 4).

Figure 4:
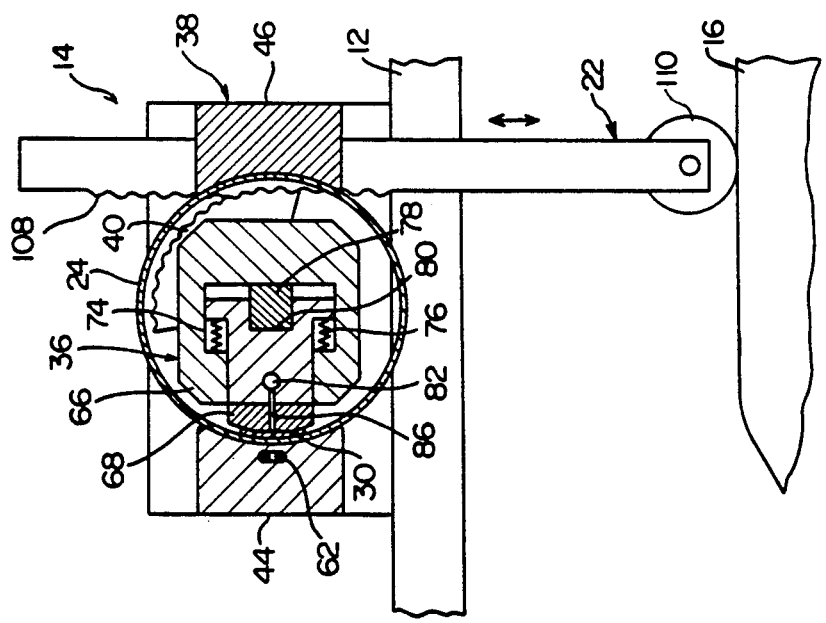
FIG. 4 is a sectional view taken along line IV—IV of FIG. 2.

As shown in FIGS. 2 and 4, the mandrel 36 includes a mandrel body 66, a holding portion 68 for holding the tape-like resin 30 and partial gear 40. The mandrel body 66 is disposed extending through the bottom plate 42 of the frame 38 so that it can rotate over a predetermined angular range. The connection hole 54 provided in the mandrel body 66 communicates with the communication hole 48 of the bottom plate 42 in all angular positions of the mandrel body 66. A cyclindrical hole 72 whose axis is the rotating axis of the mandrel body 66 is formed in the mandrel body 66. The first cam follower 20 extends through this cylindrical hole 72. The mandrel body 66 has a chamber 74 for accomodating the holding portion 68. The holding portion 68 is disposed within the chamber 74 so that it can reciprocate vertically in FIG. 2 (the left-right directions in FIG. 4). The holding portion 68 is forced downwardly (the right direction in FIG. 4) in FIG. 2 by a spring 76 (FIG. 4), and is contiguous to an inclined plate 78 of the first cam follower 20. The holding portion 68 has an inclined surface 80 contiguous to the inclined plate 78. The position of the holding portion 68, or the degree of its projection from the chamber 74, is determined by the longitudinal (the left-right direction in FIG. 2) position of the first cam follower 20. A conduit hole 82 is formed in the holding portion 68, and communicates with the connection hole 54 formed in the mandrel body 66. The holding portion 68 has a contacting portion 84 which makes contact with the tape-like resin. The contacting portion 84 is made of a material having poor adhesion to the tape-like resin 30 (that is, an easily peelable material). Preferably, the contacting portion 84 is formed of a heat-resistant rubber such as a silicone rubber with a rubber hardness of 40° to 60°. A plurality of holding holes 86 are formed communicating with the conduit hole 82. Accordingly, the holding holes 86 communicate with a vacuum source (not shown) through the conduit hole 82, the connecting hole 54, the communication hole 48 and a control device (not shown). The tape-like resin 30 is held by the contacting portion 84 by the vacuum force of the holding openings 86. The partial gear 40 meshes with the second cam follower 22 whereby the rotating angular position of the mandrel 36 is determined by the longitudinal (vertical direction in FIG. 4) position of the second cam follower 22.

The first cam follower 20, as shown in FIG. 2, includes the inclined plate 78, a rod 88 one end of which is fixed to the inclined plate 78, a spherical portion 90 fixed to the other end of the rod 88, a roller supporting portion 94 having formed at one end a depressed part 92 adapted to receive the spherical portion 90, and a roller 96 supported rotatably at the other end of the roller supporting portion 94. The position of the holding portion 68 is determined by the longitudinal (the left-right directions in FIG. 2) of the inclined plate 78. The rod 88 extends through the cylindrical hole 72 of the mandrel body 66 and is adapted to move longitudinally of the cylindrical hole 72. A flange 98 is formed at that end portion of the rod 88 to which the spherical part 90 is fixed. A spring 100 is disposed between the flange 98 and the mandrel body 66 so as to force the rod 88 to the right in FIG. 2. Specifically, it forces the first cam follower 20 toward the central stationary cam 10. The spherical part 90 fixed to the rod 88 and the depressed portion of the roller supporting portion 94 form a universal joint. As a result, the rod 88 cannot move longitudinally (in the left-right directions in FIG. 2) with respect to the roller supporting portion 94, but can rotate about the longitudinal axis of the roller supporting portion 94. The roller supporting portion 94 has two fitting parts 104 and 106 to engage a rail 102 having a nearly T-shaped cross section and fixed to the rotating plate 12, whereby the roller supporting portion 94 can move only longitudinally (the left-right directions in FIG. 2) of the rail 102, and therefore of the rotating plate 12. The roller 96 is rotatably supported on one end of the roller supporting portion 94 and is in press contact with the central stationary cam 10 by the spring 100. The adhering device 14 is fixed to the rotating plate 12 and together rotates by 90° each time. The central stationary cam 10 stands still. Thus, as the rotating plate 12 rotates, the first cam follower 20 moves longitudinally thereof according to the shape of the central stationary cam 10 and the position of the holding portion 68, i.e. the degree of its projection from the chamber 74, changes.

Figure 5:
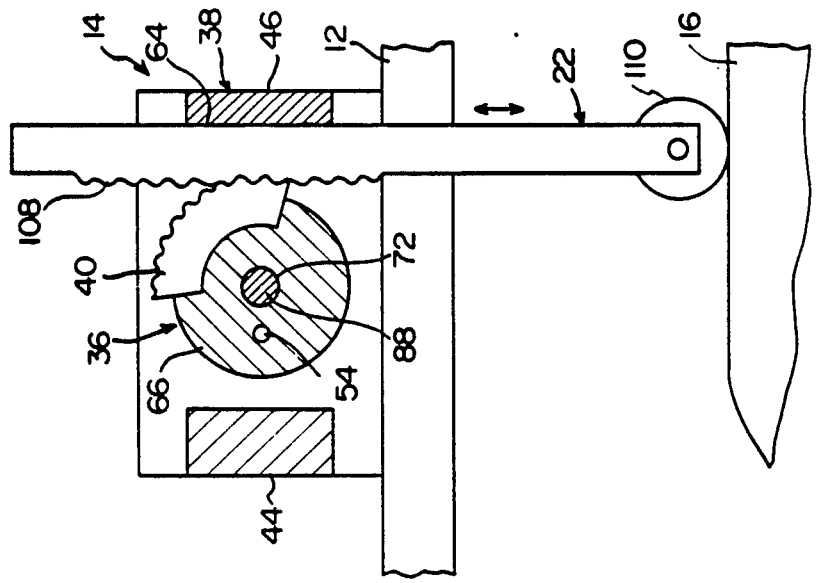
FIG. 5 is a sectional view taken along line V—V of FIG. 2.

The second cam follower 22 is supported by the side plate 46 of the frame 38 so that it can move longitudinally thereof (in the vertical direction in FIGS. 4 and 5), as shown in FIGS. 2, 4 and 5. As shown in FIG. 4, the second cam follower 22 has a rack portion 108 to be in mesh with the partial gear 40 of the mandrel 36 and a roller 110 rotatably supported at one end, as shown in FIG. 4. The second cam follower 22 is forced downwardly in FIGS. 4 and 5 by a spring (not shown). Hence, the roller 110 of the second cam follower 22 is in press contact with the cylindrical rib cam 16, and according to the raised and depressed parts of the cylindrical rib cam 16 in the vertical direction of FIG. 5, the second cam follower 22 moves longitudinally and thereby rotates the mandrel 36. When the mandrel 36 rotates, the inclined plate 78, the rod 88 and the spherical portion 90 of the first cam follower 20 rotate accordingly, but since the spherical portion 90 and the depressed portion 92 of the roller supporting portion 94 constitute a universal joint, the roller supporting portion 94 and the roller 96 do not rotate.

The adhering device 14 cooperate with the delivery device 26, the primary high frequency coil 28, the carrying device 32 and the transferring device 34 (FIG. 6) at the loading position, the adhering position, the carrying position and the transferring position, as shown in FIG. 1.

The delivery device 26, as shown in the left side of FIG. 1 and FIG. 2, is provided with a feed rod 112 and a plurality of claws 114 provided on it. When the feed rod 112 reciprocates in the left-right directions in FIGS. 1 and 2, fixed the can body 24 at a suitable fixing position, releases it and moves in the right direction in FIGS. 1 and 2, the claws 114 engages the rear end of the can body 24 to move it. When the feed rod 112 moves in the left direction in FIGS. 1 and 2, the claws slide over the outside surface of the fixed can body 24. In this manner, can bodies 24 are delivered successively into the adhering devices 14. FIG. 1 shows the state where the can body 24 has been delivered, and FIG. 2 shows the state during delivery. When the can body 24 is delivered, the holding portion 68 of the mandrel 36 is in a retracted position as shown in FIG. 2.

As shown on top of FIG. 1 and in FIG. 3, the primary high frequency coil 28 is positioned opposite to the secondary high frequency coil 60 of the adhering device 14 when the adhering device 14 is at the heating position. Thus, when a high frequency current is supplied to the primary high frequency coil 28, an electric power is supplied to the secondary high frequency coil 60 as an electromagnetic energy, and an electric current flows in the heating 62 connected to the secondary high frequency coil 60. As a result, the welded part of the can body 24 and the tape-like resin 30 disposed inwardly thereof are pressed by the inner wall 56 of the side plate 44 and the contacting part 84 of the holding portion 68. Moreover, the electromagnetic energy from the heating coil 62 causes an electric current to flow through the welded part and its vicinity of the can body to heat them.

The carrying device 32 is of a similar structure to that of the delivery device 26 as shown in the right side of FIG. 1, and has a feed rod 116 and claws 118. The carrying device 32 removes from the adhering device 14 the can body 24 while the pressurization between the inner wall 56 of the side plate 44 and the contacting part 84 of the holding portion 68 is cancelled. Thereafter, it advances the removed can body 24 to the next step.

Figure 7:
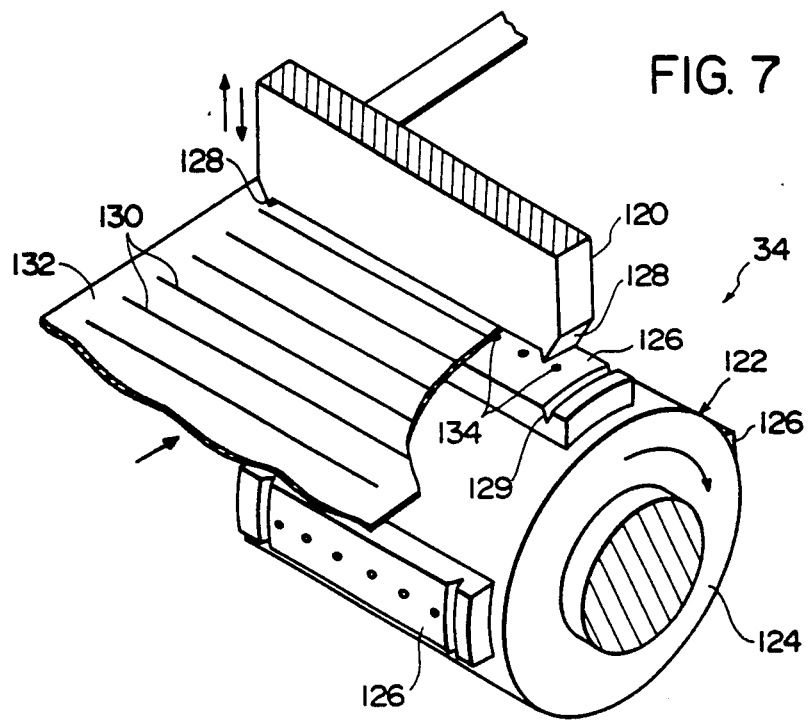
FIG. 7 is a perspective view, partly broken away, of the transferring device of FIG. 6.

The transferring device 34 is disposed so as to cooperate with the adhering device 14 held at the transferring position on the bottom of FIG. 1, and its details are shown in FIGS. 6 and 7. The transferring device 34 has a cutter 120 and a transfer roll 122. The cutter 120 is provided so that it can move vertically in FIGS. 6 and 7. It is moved by a driving device (not shown). The transfer roll 122 includes a transfer roll body 124 disposed rotatably about the longitudinal axis as a center and four holding parts 126 fixed to it. A blade part 128 of the cutter 120 cooperates with a blade part 129 of each holding part 126 of the transfer roll 122 and cuts a sheet-like resin 132 having a slit 130 into the tape-like resin 30 (FIG. 7). Each of the holding parts 126 of the transfer roll 122, like the holding portion 68 of the mandrel 36, has a plurality of holding openings 134 and a conduit hole 136. The conduit hole 136 communicates with a vacuum source (not shown) through a control device (not shown). As a result, the holding part 126 of the transfer roll 122 can hold the tape-like resin 30 on its surface. The transfer roll 122 is intermittently rotated by 90° in synchronism with the intermittent rotation of the rotating plate 12 by 90°. Thus, one holding part 126 of the transfer roll 122 and the holding portion 68 of the mandrel 36 are arranged in an aligned relationship as shown in FIG. 6. After this arrangement, one tape-like resin 30 held by one holding part 126 of the transfer roll 122 is transferred to the holding portion 68 of the mandrel 36. Specifically, the transfer roll 122 is intermittently rotated clockwise by 90° in FIG. 6. The holding openings 134 and the conduit hole 136 of the holding part 126 are caused to communiate with a vacuum source (not shown) by a control device (not shown) when the holding portion 68 is at the top position and the right position in FIG. 6. When they are at the bottom position at which they are in alignment with the holding portion 68 of the mandrel 36, their communication with the vacuum source is switched over to communication with the atmosphere. When they are at the left position, they communicate with the atmosphere. On the other hand, when the mandrel 36 is moved to the position shown in FIG. 6, namely the bottom position in FIG. 1, it is directed by the second cam follower 22 so that its holding portion 68 faces upwardly in FIG. 6, as shown in FIG. 6, and the holding portion 68 is held at a position projected from the chamber 74 by the first cam follower 20 as shown in FIG. 6. After the mandrel 36 is positioned at the position shown in FIG. 6, the holding openings 86 and the conduit hole 82 of the holding portion 68 are caused to communicate with the vacuum source by the control device (not shown). In this manner, the tape-like resin 30 held by the holding part 126 of the transfer roll 122 is transferred to the holding portion 68 of the mandrel 36. Of course, according to this construction, the transfer roll 122 and the mandrel 36 should be arranged so that there is some clearance between the under surface of the tape-like resin 30 held by one of the holding parts 126 of the transfer roll 122 and the upper surface of the holding portion 68 of the mandrel 36. Instead of this construction, it is possible to provide such a construction that by using a cam different from the central stationary cam 10, the holding portion 68 of the mandrel 36 moves to a projecting position from its retracted position after the mandrel 36 has moved to the position shown in FIG. 6.

As stated above, in the present embodiment, the central stationary cam 10 has the outer configuration shown in FIG. 1, and moves the first cam follower 20 to induce the following actions. Specifically, when the adhering device 14 is at the bottom position in FIG. 1 (the transferring position), the holding portion 68 of the mandrel 36 is projected to make it easy to transfer and apply the tape-like resin 30. When the adhering device 14 is at the left position in FIG. 1 (the loading position), the holding portion 68 of the mandrel 36 is retracted to make possible the delivery of the can body 24 as shown in FIG. 2. When the adhering device 14 is at the top position in FIG. 1 (adhering position), the holding portion 68 of the mandrel 36 is projected to press the bonded part of the can body 24 and the tape-like resin 30 as shown in FIG. 4. When the adhering device 14 is at the right position in FIG. 1 (the carrying position), the holding portion 68 of the mandrel 36 is retracted to make it possible to carry the can body 24.

The cylindrical rib cam 16 has raised and depressed portions vertically of the sheet surface in FIG. 1 by which the second cam follower 22 is moved and the rotating position of the cam is adjusted. Specifically, when the adhering device 14 is at the bottom postion in FIG. 1 (the transferring position), the second cam follower 22 is at the downward position as shown in FIG. 6 and the mandrel 36 is held at the rotating position at which its holding portion 68 faces upwardly in FIG. 6. As a result, the tape-like resin 30 can be easily transferred. When the adhering device 14 is at the left position in FIG. 1 (the loading position), the top position of FIG. 1 (adhering position) right position in Figrue 1 (carrying position), the second cam follower 22 is at an upward position and the mandrel 36 is held at the rotating position at which the holding portion 68 is opposite to the side plate 44 of the frame 38, as shown in FIGS. 4 and 5. When the adhering device 14 is at the left position of FIG. 1 (the loading plosition) and the right position (carrying position), the can body 24 can be delivered and carried away since as stated hereinabove, the holding portion 68 of the mandrel 36 is retracted by the action of the first cam follower 20. When the adhering device 14 is at the top position of FIG. 1 (the adhering position), the mandrel 36 is held at the rotating position at which the holding portion 68 is opposite to the side plate 44 of the frame 38, and the holding portion 28 is projected, the welded part of the can body 24 and the tape-like resin 30 are pressed between the holding portion 68 of the mandrel 36 and the side plate 44.

As stated above, the holding holes 86 and the conduit hole 82 are formed in the holding portion 68 of the mandrel 36, and communicate with a vacuum source (FIG. 2) through he connection hole 54, the communication hole 48 and a control device (not shown). When the adhering device 14 is held at the bottom position of FIG. 1 (the transferring position), the communication of the holding openings 86 and the conduit hole 82 of the holding portion 68 with the atmospheric air is switched over to communication with the vacuum source by the control device, and the tape-like resin 30 is transferred to the mandrel 36 by means of the transfer roll (FIG. 6). When the adhering device 14 is at the left position in FIG. 1 (the loading position), the holding openings 86 and the conduit hole 82 of the holding portion 68 are caused to communicate with the vacuum source by the control device, and consequently, the tape-like resin 30 is held on the holding portion 68 (FIG. 2). Before the adhering device 14 is moved to the top position in FIG. 1 (the adhering position), the holding portion 68 of the mandrel 36 is projected, and the tape-like resin 30 is held between the holding portion 68 and the side plate 44 of the frame 38 and the can body 24. Thereafter, by the control device, the holding holes 86 and the conduit hole 82 of the holding portion 68 are caused to communicate with the atmosphere. When the adhering device 14 is at the top position in FIG. 1 (the adhering position) and at the right position in FIG. 1 (the carrying position), the holding openings 86 and the conduit hole 82 of the holding portion 68 are caused to communicate with the atmosphere by the control device.

(Operation)

The operation of the apparatus of the first embodiment will be briefly described below.

In the adhering device 14 held at the bottom in FIG. 1 (the transferring position), the holding portion 68 of the mandrel 36 is projected by the first cam follower 20 and the second cam follower 22. From the transferring device 34, the tape-like resin 30 is transferred to the holding portion 68 of the mandrel 36 from the transferring device 34 by the controlling device (not shown) for controlling communication with the vacuum source (not shown). Since the holding portion 68 of the mandrel 36 holds the entire tape-like resin 30, the tape-like resin 30 can be positioned accurately with relative ease with respect to the holding portion 68. When the holding portion 68 itself of the mandrel has the blade portion 129 for cutting the sheet-like resin 132 into the tape-like resin 30 as stated above, the positioning is particularly accurate.

Thereafter, the rotating plate 12 is rotated by 90°, and the adhering device 14 is held at the left position in FIG. 1 (the loading plosition). At this position, the holding portion 68 of the mandrel 36 is at the retracted position and held at the rotating position facing upwardly in FIGS. 1 and 2. By the delivery device, the can body 24 is loaded into the adhering device 14. If requried, a known means is provided for accurately defining the position, particularly the longitudinal (the left-right directions in FIG. 2) position, of the can body within the adhering device 14. In this way, the can body and the tape-like resin 30 held by the mandrel 36 can be positioned accurately relative to each other.

The rotating plate 12 is further rotated by 90° and the adhering device is held at the top position in FIG. 1 (adhering position). At this position, the holding portion 68 of the mandrel 36 is projected, and the vicinity of the welded part of the can body 24 is heated by the action of the primary high frequency coil 28 and the secondary high frequency coil 60. As a result, the tape-like resin 30 is heat-adhered to the welded part of the can body 24. If, for example, immediately before loading the can body 24 into the bonding device 14 at the left position in FIG. 1 (loading position), the can body 24 is welded and is placed at the top position in FIG. 1 (adhering position) while its welded part is still at a sufficiently high temperature, the aforesaid members for heating, i.e., the primary high frequency coil 28, the secondary high frequency coil 60, etc. are not required.

Furthermore, the rotating plate 12 is rotated by 90°, and the adhering device is held at the right position in FIG. 1 (the carrying position). At this position, the holding portion 68 of the mandrel 36 is detracted, and the welded can body 24 having the tape-like resin adhered to its welded part is carried away from the adhering device 14 including the mandrel 36.

Figure 8:
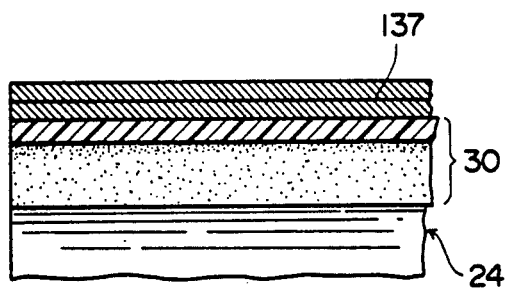
FIG. 8 is a sectional view of a part of a can body produced by the apparatus in accordance with the first embodiment of the invention.

The cross section of the welded part 137 of the can body 24 so organic-coated is shown in FIG. 8.

(Operating conditions)

The first embodiment is preferably operated under the following operating conditions.

In the pressurising step, the tape-like resin 30 and the welded part are pressurized by the contacting portion 84 of the mandrel 36 and the inner wall 56 of the side plate 44 under a pressure of, for example, 1 to 15 kg/cm$^2$ for 0.1 to 1.0 second. The desirable pressure and the the desirable pressurizing time $t_1$ vary depending upon the degree of elasticity, shape, etc. of the tape-like resin 30 used and the contacting portion 18 of the mandrel 36. But the pressurizing time $t_1$ is desirably at least 0.1 second in order that air can be driven off from the stepped portion during the pressurizing step.

In the next heating step, while the tape-like resin 30 and the welded part are pressurized as stated above, the secondary high frequency coil 60 as a heating element is actuated to heat the tape-like resin 30 for a predetermined period of time $t_2$ to a temperature at least 25° C. above the softening temperature. The temperature of the tape-like resin at this time is measured by securing a thermocouple to the welded part, applying the tape-like resin to the thermocouple, and defining a value obtained from the output of the thermocouple at this time as the temperature of the tape-like resin.

It is necessary that the tape-like resin 30 be heated uniformly to a temperature at least 25° C. above the softening temperature, preferably at least 25° C. above the softening temperature to at least 200° C. above the softening temperature, more preferably at least 30° C. above the softening temperature to at least 150° C. above the softening temperature.

If the temperature for heating the tape-like resin 30 is lower than the softening temperature plus 25° C., sufficient adhesion strength cannot be obtained. The tape peels off during flanging, bead formation or seaming and the protection of the welded part or its vicinity becomes incomplete. On the other hand, when the heating temperature exceeds the softening temperature plus 200° C., the degradation of the resin, the exposure of the metal at the corner of the stepped portion in the welded part (owing to the decrease of the resin viscosity), the formation of bubbles, or the stretching or breaking of the film tend to occur.

The softening temperature of the tape-like resin denotes the softening temperature of the adhesive layer of the resin adhered to the metal surface (sometimes the tape-like resin is composed only of the adhesive layer). The softening temperature is measured by the ring and ball method. The softening temperature of a crystalline polymer can be regarded approximately as its melting point.

When the holding portion 68 has an elastic contacting portion having a flat surface as stated above, the adhering can be effected by heating within a short period of time. By using a high frequency coil for heating, the adhering can be effected even within about 0.1 to 0.2 second. But when the variations in temperature distribution are considered, heating for a period of at least 0.3 to 0.5 second is preferred. On the other hand, when the heating time is too long, the resin flows too much and is likely to cause imperfect correction.

After the heating step, the operation of the secondary high frequency coil 60 is stopped while the tape-like resin 30 and the welded part are maintained in the pressurized state as stated above. The tape-like resin 30 is cooled to a temperature lower than the softening temperature plus 20° C., preferably a temperature lower than the softening temperature plus 5° C., by leaving it to stand for a predetermined period $t_3$, or by using a cooling means.

If it is not cooled to below the softening temperature plus 20° C. in the pressurized state, bubbles form in the resin and the organic coating of the welded part becomes incomplete, the appearance becomes poor, and the resistance of the can body to an article to be filled is reduced.

The cooling time $t_3$ varies depending upon the heating temperature, the wall thickness of the can body, the thickness of the tape-like resin, the material of which the elastic portion is made, the presence or absence of the cooling means, but is desirably at least 0.2 second. Longer cooling periods of time $t_3$ are preferred because the adhesion strength becomes stable and air is easy of escaping from the stepped portion.

Means for cooling the tape-like resin and the welded part are, for example, passing of cooling water or Furon gas through the heating coil or the use of ceramics as the surface of the side plate 44 which comes into contact with the welded part.

Figure 9:
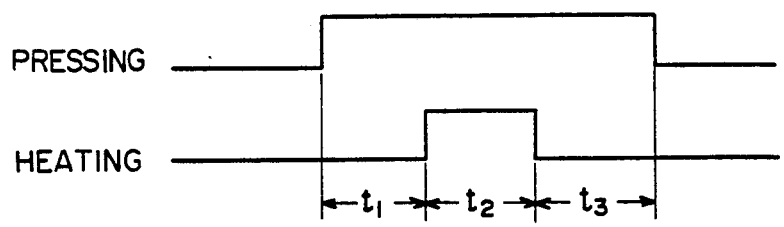
FIG. 9 is a simplified view showing the time relationship in the pressing and heating steps in the apparatus in accordance with the first embodiment of the invention.

A typical time relationship between pressing and heating in the first embodiment is shown in FIG. 9. As shown clearly in FIG. 9, pressing is first carried out for a period of $t_1$; then heating is carried out for a period of $t_2$ in the pressurized state; heating is stopped and the tape-like resin and the welded part are left to stand for a period of $t_3$ to cool them in the pressurized state.

In the above-described embodiment, the tape-like resin is pressed and heated while being pressed. However, this is not always necessary. It is possible to heat the tape-like resin in advance to the desired temperature, then press it, and in the pressed state to raise the temperature of the tape-like resin to at least 25° C. above the softening temperature.

By so doing, the film is softened and fits into the stepped portion in the welded part during pressing. This has an effect of driving off air from the stepped portion, and a welded part having an excellent coated appearance can be obtained. Furthermore the pressing time can be shortened.

In the aforesaid embodiment, a fixed pressing force is exerted on the tape-like resin during the pressing step and the heating step. Instead of this, one may change the pressing force with time according to the temperature of the tape-like resin.

Alternatively, the welded part of the welded can body is pre-heated to the desired temperature, and then the tape-like resin is pressed against it. In this pressed state, the temperature of the tape-like resin may be elevated to at least 25° C. above the softening temperature. In this case, the organic coating can be effected without re-heating after creating the pressed state.

(Welded Can Body)

The metal blank for welded can bodies is usually made of a plate of iron, low-carbon steel, tin-free steel, tin-coated iron or steel, low tin-plated steel, nickel-plated steel or nickel/tin-plated steel having a thickness of 0.1 to 0.6 mm.

The method of producing a welded can body is not particularly limited, but it is preferable to use a welded can body mash seam-welded by the so-called Soudronic method, the method described in U.S. Pat. No. 4,334,138, for example. Preferably, the welded part of the welded can body obtained by the above methods has a width in the range of 0.2 to 2.0 mm and a thickness of 1.0 t to 1.85 t (where t is the original plate thickness of the can body).

(Tape-Like Resin)

The tape-like resin described above is composed of a single layer or a laminate. In the case of the single layer, the resin forming the film is desirably capable of being melt-adhered under heat to the metallic blank forming the welded part. Examples of such a resin include thermoplastic resins, for example polyesters using terephthalic acid as a main component, such as polyethylene terephthalate (PET), polybutylene terephthalate (PBT) or a copolymer of PBT with polybutylene isophthalate, aliphatic polyamides such as nylon 6, nylon 6-6, nylon 6-10, nylon 11 and nylon 12, aromatic polyamides such as poly(p-xylylene), polyvinylidene chloride and polyvinyl chloride including copolymers of vinylidene chloride with at least one of vinyl chloride, vinyl acetate, acrylonitrile, (meth)acrylic esters, allyl esters, unsaturated ethers and styrene, polyolefins such as polypropylene, high-density polyethylene and malenic acid-modified polypropylene, an ethylene/vinyl alcohol copolymer obtained by saponification of an ethylene/vinyl acetate copolymer, polymethacrylates such as polymethyl methacrylate, vinyl polymers such as polyvinyl acetate and polystyrene, fluorine-containing polymers such as polyvinylidene fluoride, a series of ionomers containing zinc, sodium, etc., aromatic heterocyclic polymers such as polyimide, and polyethers; and thermosetting resins such as phenol/formaldehyde resins, furane/formaldehyde resins, xylene/formaldehyde resins, ketone/formaldehyde resins, urea/formaldehyde resins, melamine/formaldehyde resins, alkyd resins, unsaturated polyester resins, epoxy resins, bismalimide resins, triallyl cyanurate resins, heat-curable acrylic resins, silicone resins and oily resins.

The tape-like resin has a thickness of preferably 5 to 300 micrometers, more preferably 10 to 15 micrometers.

In the case of the laminate, there can, for example, be used conveniently a two-layer laminated film composed of an adhesive layer to be melt-adhered under heat to the welded part and a barrier layer of a resin having a higher melting point than the resin of the adhesive layer and excellent barrier property. In this case, resins suitable for the single layer are also suitable as the adhesive layer. The material is, for example, a copolymer of polybutylene terephthalate (PBT) and polybutylene isophthalate (PBI) for the adhesive layer, and polyethylene terephthalate (PET) as the barrier layer.

A three-layer structure may also be cited in which a metallic foil layer (an aluminum foil, a steel foil, etc.) is formed on the adhesive layer and a protective layer of a metallic foil inert to an article to be filled in a can is formed as the uppermost layer.

Both in the case of the single layer and the laminate, the thickness of the tape-like resin is preferably 5 to 300 micrometers, more preferably 10 to 150 micrometers. If it is less than 5 micrometers, the protective function against the contents of a can is lost or it becomes difficult to transport or apply the tape. If it is larger than 300 micrometers, the can body is likely to buckle, or the tape is likely to peel, during flanging so that it may cause leakage of the can contents.

When the can body has a protective coating, the width of the tape-like resin should be larger than the width of the exposed metal portion near the welded part. Usually, it is 3 to 20 mm.

Second Embodiment

Figure 10:
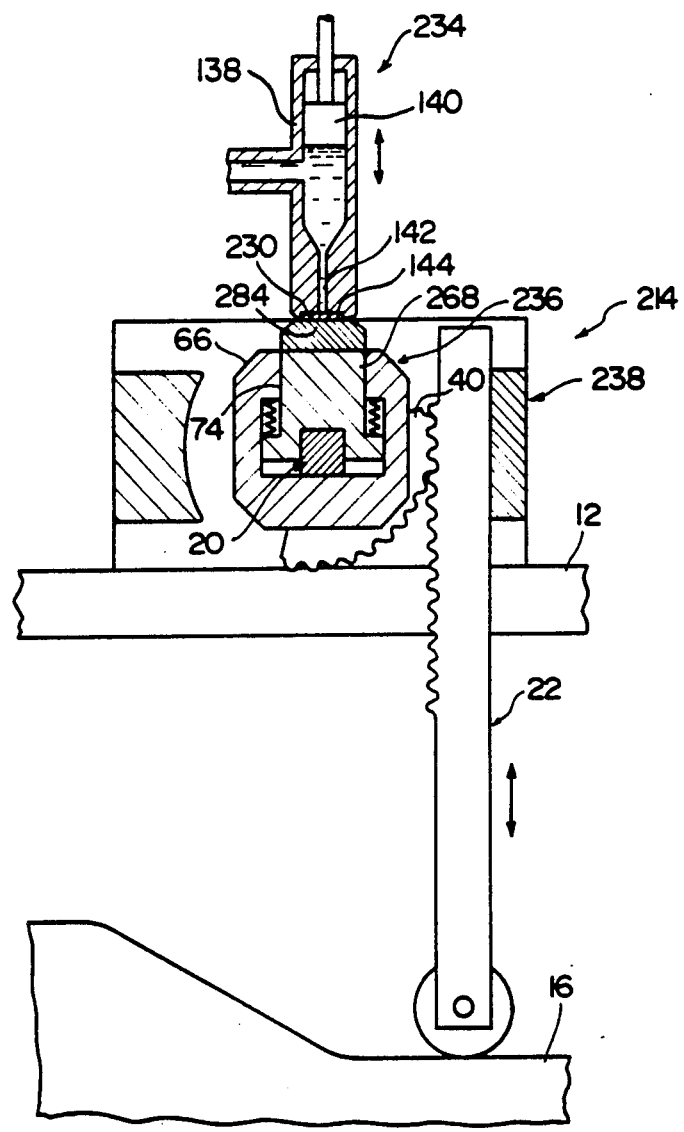
FIG. 10 is a sectional view of the essential parts of an apparatus in accordance with a second embodiment of this invention.

With reference to FIG. 10, the second embodiment of the present invention will be described. This embodiment differs from the first embodiment mainly with regard to the transferring device.

The apparatus shown in FIG. 10 includes a central stationary cam (not shown), a rotating plate 12, four adhering devices 214 and a cylindrical rib cam 16. The central stationary cam, the rotating plate 12, and the cylindrical rib cam 16 are constructed, and act, in the same way as in the first embodiment.

Each of the adhering devices 214 is comprised of a frame 238 fixed to the rotating plate 12, a mandrel 236 rotatably mounted on the frame 238, a first cam follower 20 extending into the inside of the mandrel 236 and a second cam follower 22 adapted to engage a partial gear 40 of the mandrel 236. The first cam follower 20 and the second cam follower 22 in the second embodiment are constructed, and act, in the same way as in the first embodiment.

The frame 238 is constructed in much the same way as in the first embodiment, but differs from the frame in the first embodiment in that it does not include a control device, and a communication hole and a groove which are to communicate with a vacuum source.

The mandrel 236 includes a mandrel body 66, a holding portion 268 for holding a tape-like resin 230, and a partial gear 40. The mandrel body 66 and the partial gear 40 are constructed, and act, in the same way as in the first embodiment. The holding portion 268, as in the first embodiment, is received in the chamber 74 of the mandrel body 66, and is adapted to move between a projecting position and a retracted position by the first follower 20. The holding portion 268 has a contacting portion 284 formed of a material having poor adhesion to the tape-like resin 230. Unlike the corresponding parts in the first embodiment, the holding portion 268 and the contacting portion 284 do not include a communication hole and holding openings.

The transferring device 234 shown in FIG. 10 is disposed such that it cooperates with the adhering device 214 held at a transferring position same as the applying position at the bottom of FIG. 1. The transferring device 234 includes an accommodating portion 138 for accommodating a molten resin, and a reciprocably movable piston 140 is disposed within the accommodating portion 138. The movement of the piston 140 causes a desired amount of the resin to be injected from the accommodating portion 138. The accommodating portion 138 includes an injection opening 142 and a groove 144 leading to the injection opening 142. The groove 144 forms a sealed space of the desired tape shape together with the upper surface in FIG. 10 of the contacting portion 284 of the holding portion 268. A heater (not shown) for heating the molten resin is provided in the accommodating portion 138.

The transferring device 234 is movable vertically in FIG. 10, and as shown in FIG. 10, can move between a position at which the accommodating portion 138 is in press contact with the holding portion 268 of the mandrel 236 to form a sealed space of the desired tape shape and a position at which the accommodating portion 138 is apart from the holding portion 268.

The apparatus shown in FIG. 10 operates as follows. The transferring device 234 is at a position at which the accommodating portion 138 is apart from the holding portion 268 of the mandrel 236. The adhering device 214, as in the first embodiment, is moved to the bottom position in FIG. 1 (transferring position) by the rotation of the rotating plate 12. As shown in FIG. 10, at this transferring position, the holding portion 268 of the mandrel 236 is projected by the first cam follower 20, and the mandrel 236 is directed by the second cam follower 22 so that the holding portion 268 is on top in FIG. 10. Then, the transferring device 234 is moved to a position at which the accommodating portion 138 is in intimate contact with the holding portion 268. The piston 140 is then moved, and the desired amount of the resin is injected into the sealed space in tape form formed by the groove 144 of the accommodating portion 138 and the upper surface in FIG. 10 of the holding portion 268. Thereafter, the transferring device 234 is returned to a position at which the accommodating portion 138 is apart from the holding portion 268 of the mandrel 236. In this manner, the tape-like resin 230 is formed and held on the holding portion 268.

In the second embodiment, the subsequent steps, i.e. the loading step, the adhering step and the carrying step are effected in the same way as in the first embodiment.

In the second embodiment, too, the tape-like resin 230 can be accurately positioned at the desired position of the holding portion 268 of the mandrel 236. Hence, the tape-like resin 230 can be accurately positioned at the desired site of the welded part of the can body. If, for example, the tape-like resin 230 is at a sufficiently high temperature at the adhering position, a member for heating the welded part of the can body can be omitted.

Third Embodiment

Figure 11:
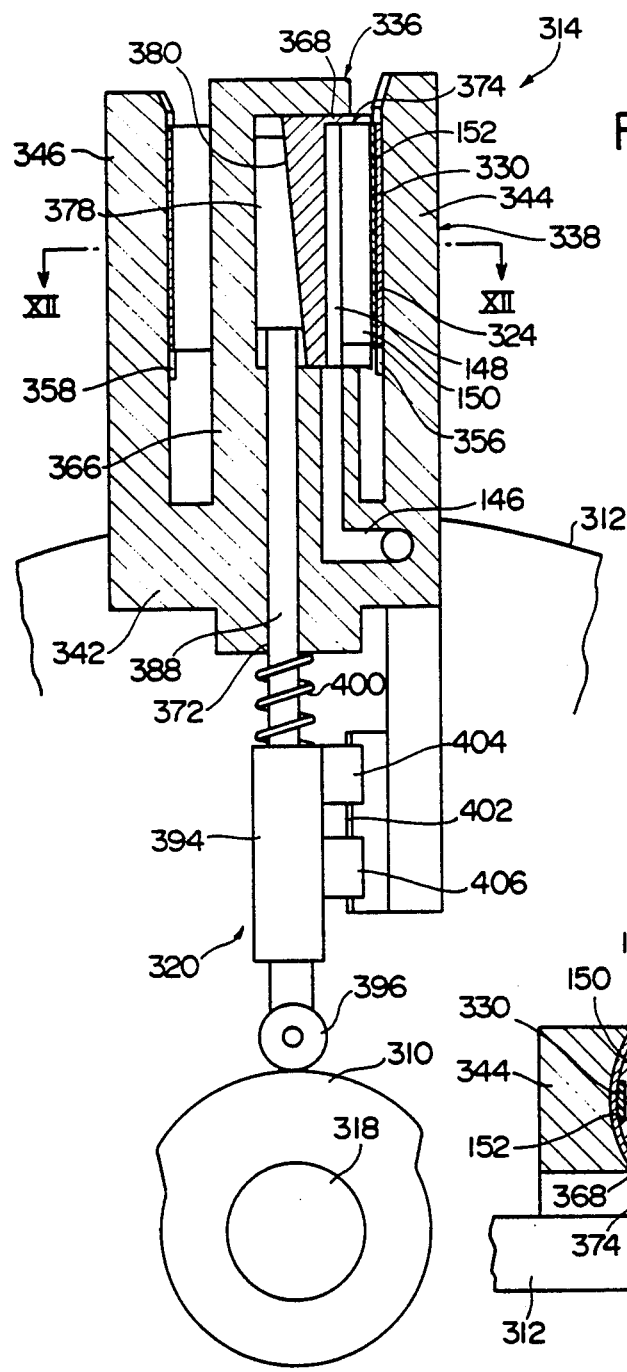
FIG. 11 is a top plan view of the essential parts of an apparatus in accordance with a third embodiment of the invention partly in section.
Figure 12:
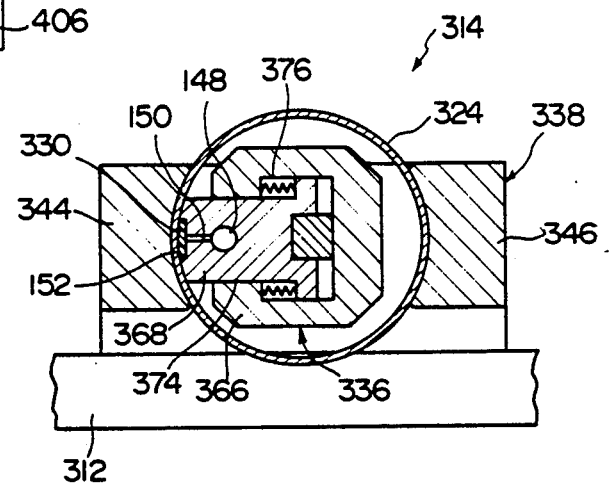
FIG. 12 is a sectional view taken along line XII—XII of FIG. 11.

With reference to FIGS. 11 and 12, the third embodiment of the present invention will be described.

The apparatus shown in FIG. 11 includes a central stationary cam 310, a rotating plate 312 and three adhering devices 314 (only one of which is shown). This apparatus, unlike the apparatuses described above, does not include a cylindrical rib.

The central stationary cam 310 is fixed to a fixed shaft 318. The peripheral surface of the central stationary cam 310, as is shown in FIG. 11, is raised in an area of about one-third and depressed in an area of about two-thirds.

The rotating plate 312 is supported rotatably on the fixed shaft 318, and is rotated intermittently by 120° by a driving device (not shown).

The three adhering devices 314 are fixed to the rotating plate 312 at equiangular intervals. Each adhering device 314 has a cam follower 320 adapted to enagage the central stationary cam 310.

Each adhering device 314 is held successively at the following three operating positions. First, at the left bottom position in FIG. 11, i.e. a loading position (not shown), a can body 324 formed from a plate-like material by a welding device (not shown) is placed on, and loaded into, the adhering device 314 by a delivering device (not shown). The delivering device may be the same as the device shown in FIG. 1, etc. At the top position shown in FIG. 11, i.e. the adhering position, the molten resin is supplied to the inside of the welded part of the can body 324 to form a tape-like resin 330. At the right bottom position in FIG. 9, i.e. a carrying position (not shown), the can body 324 is carried away from the adhering device 314 by a carrying device (not shown).

With reference to FIGS. 11 and 12, the adhering device 314 will be described in detail.

The adhering device 314 includes a frame 338 fixed to the rotating plate 312, a mandrel 336 fixedly provided within the frame 338 and a cam follower 320 extending into the inside of the mandrel 336.

The frame 338 includes a bottom plate portion 342 fixed to the rotating plate 312 and two side plate portions 344 and 346 extending nearly radially of the rotating plate 312 from the bottom plate portion 342, and they are formed integrally as a one-piece structure. Within the bottom plate portion 342 is formed a supply hole 146 communicating with a molten resin supply source not shown) through an adjusting device (not shown). By the adjusting device, a molten resin is supplied in a predetermined amount at a predetermined time from a supply source, as will be described hereinafter. The side plate portions 344 and 346 have inner walls 356 and 358 partly forming a cylindrical shape conforming to the outer configuration of the can body 324 to be inserted, and by these inner walls, the can body 324 can be held.

The mandrel 336, as shown in FIGS. 11 and 12, includes a mandrel body 366 fixed to the bottom plate portion 342 of the frame 338 and a holding portion 368 for forming the tape-like resin 330 from the molten resin and holding it. An elongate hole 372 extending longitudinally (vertically in FIG. 11) is formed in the mandrel body 366 and the bottom plate portion 342 of the frame 338. The cam follower 320 extends through the elongate hole 372. The mandrel body 366 has a chamber 374 for receiving the holding portion 368. The holding portion 368 is disposed within the chamber 374 so that it can reciprocate in the left-right directions in FIG. 11. The holding portion 368 is forced to the left in FIG. 11 (to the right in FIG. 12) by a spring 376 (FIG. 12) and is contiguous to an inclined plate 378 of the cam follower 320. The holding portion 368 has an inclined surface 380 contiguous to the inclined plate 378. The position of the holding portion 368 is determined by the longitudinal (vertical in FIG. 11) position of the cam follower 320. A distribution hole 148 is formed in the holding portion 368, and at all positions of the holding portion 368, communicates with the supply hole 146 extending also through the mandrel body 366. The holding portion 368 also has a distribution opening 150 in the form of a slit communicating with the distribution hole 148. Accordingly, the distribution opening 150 communicates with a molten resin supply source (not shown) through the distribution hole 148, the supply hole 146 of the mandrel body 366 and the bottom plate portion 342 and the adjusting device (not shown). A groove 152 leading to the distribution opening 150 is formed in the holding portion 368. When the holding portion 368 is projected by the cam follower 320 and is contiguous to the inside surface of the can body 324, this groove 152 forms a sealed space of the desired tape shape together with the inside surface of the can body 324. Preferably, a heater (not shown) for maintaining and controlling the temperature of the molten resin is provided in the frame 338 and the mandrel 336 of the adhering device 314.

As shown in FIG. 11, the cam follower 320 is comprised of the inclined plate 378, a rod 388 with one end fixed to the inclined plate 378, a roller supporting portion 394 fixed to the other end of the rod 388, and a roller 396 supported rotatably on the roller supporting portion 394. The longitudinal (vertical in FIG. 11) of the inclined plate 378 determines the position of the holding portion 368. As shown in FIG. 11, a spring 400 is provided around the rod 388 and between the roller supporting portion 394 and the frame 338, and forces the cam follower 320 toward the central stationary cam 310. The roller supporting portion 394 has two fitting portions 404 and 406 adapted to engage a rail 402 having a nearly T-shaped cross section fixed to the rotating plate 312. As a result, the roller supporting portion 394 can move only longitudinally (vertically in FIG. 11) of the rail 402, and therefore of the rotating plate 312. Hence, according to the rotating position of the adhering device 314, the position of the holding portion 368, i.e. the extent of its projection from the chamber 374, changes.

The third embodiment operates as follows:

First, in the adhering device 314 (not shown) held at the left bottom position in FIG. 11 (the loading position), the holding portion 368 of the mandrel 336 is at a retracted position. By a delivering device (not shown), the can body 324 is held and loaded into a predetermined position of the adhering device 314.

Then, the rotating plate 312 is rotated by 120° and held at the top position shown in FIG. 11 (adhering position). At this position, the holding portion 368 of the mandrel 336 is in press contact with the inside surface of the can body 324 and forms a sealed space of the desired tape shape together with the groove 152 of the holding portion 368 and the inside surface of the can body 324. A predetermined amount of the molten resin is then supplied to the above sealed space through the molten resin supply source (not shown), the adjusting device (not shown), the supply hole 146 in the bottom plate portion 342 and the mandrel body 366, the distribution hole 148 and the distribution opening 150. As a result, the tape-like resin 330 is formed and simultaneously heat-adhered to the welded part of the can body 324.

The rotating plate 312 is further rotated by 120°, and held at the right bottom position in FIG. 11 (carrying position). At this position, the holding portion 368 of the mandrel 336 is at a retracted position, and the welded can body 324 having the tape-like resin 330 adhered to its welded part is carried away from the adhering device 314 by a carrying device (not shown).

In the third embodiment, the tape-like resin 330 is formed by the groove 152, etc. of the holding portion 368 of the mandrel 336. Since the mandrel 336 and the can body 324 placed in the adhering device 314 can be positioned relative to each other accurately with relative ease, the tape-like resin 330 can be accurately applied to the desired position of the welded part of the can body 324 with relative ease.

Fourth Embodiment

Figure 13:
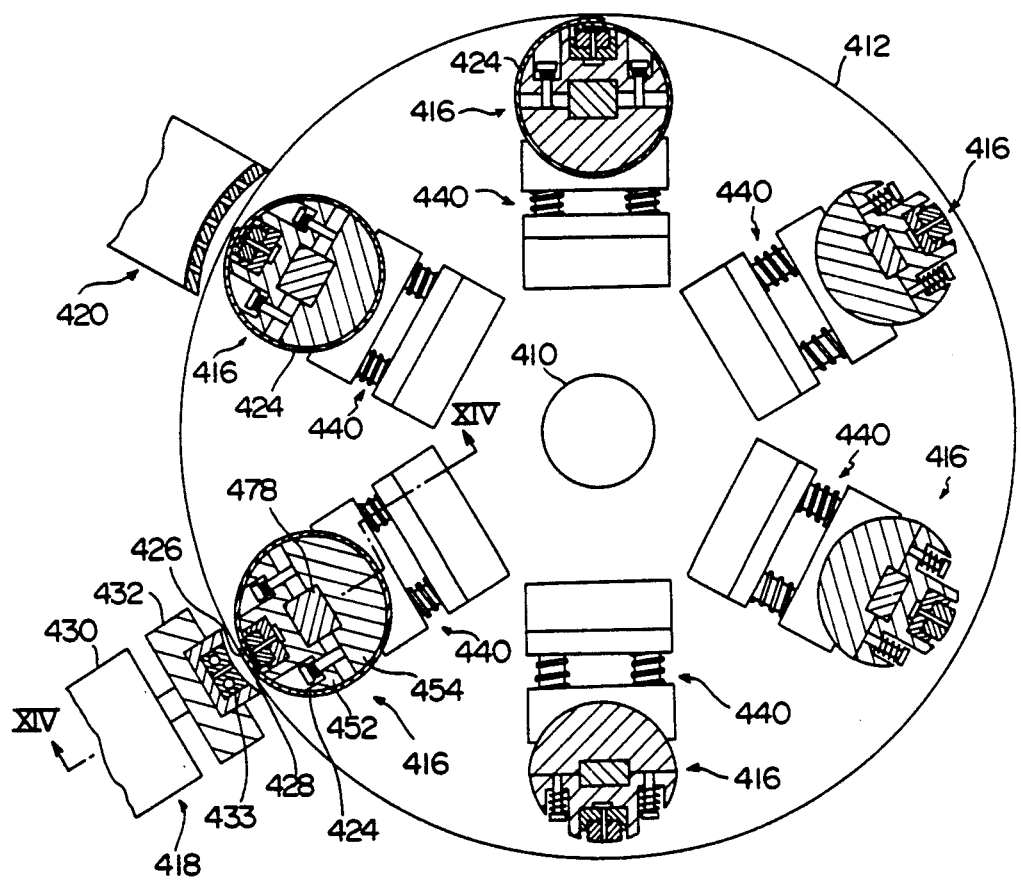
FIG. 13 is a top plan view, partly in section, of an apparatus in accordance with a fourth embodiment of the invention.
Figure 14:
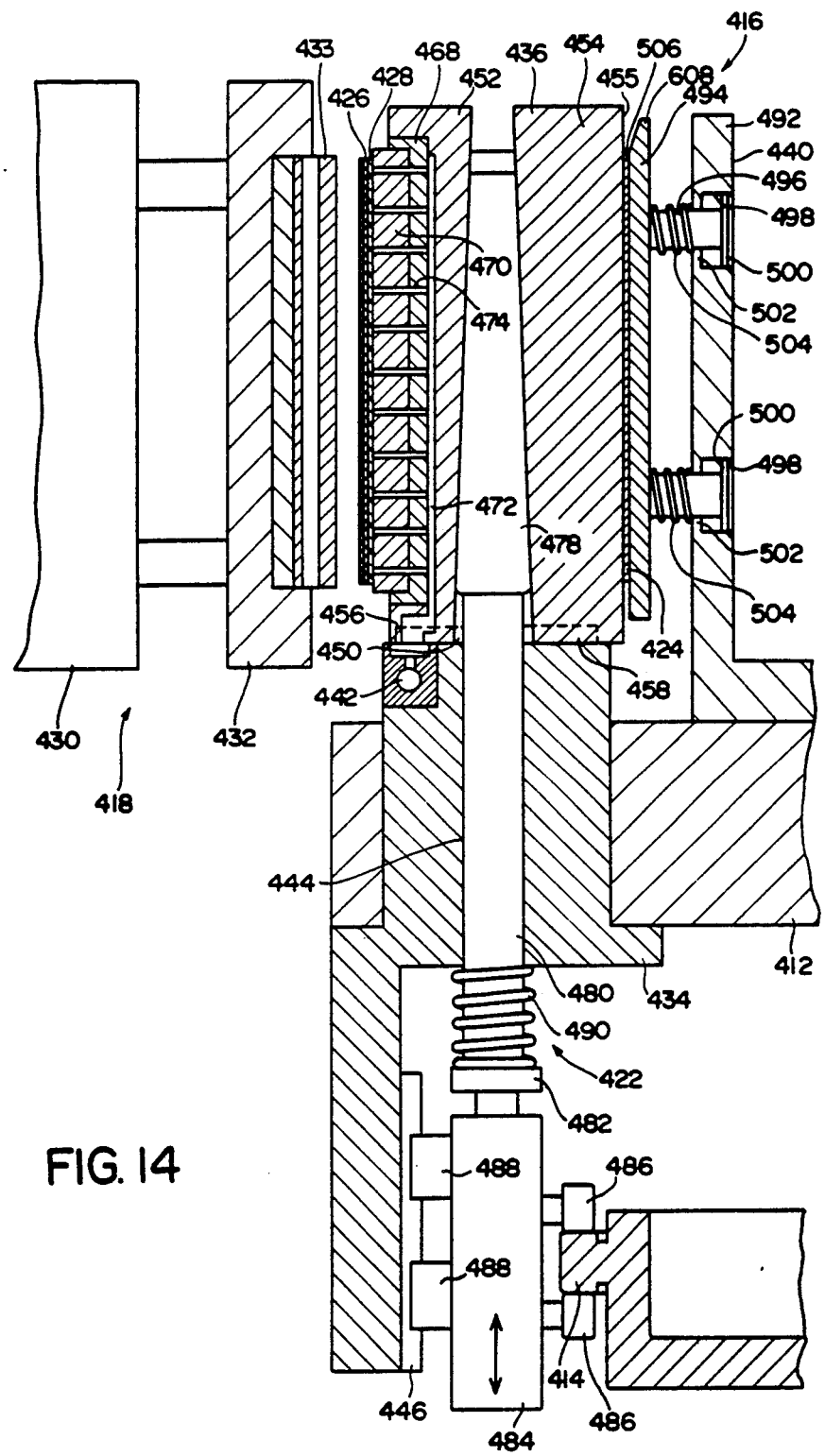
FIG. 14 is a partial sectional view taken along line XIV—XIV of FIG. 13.
Figure 15:
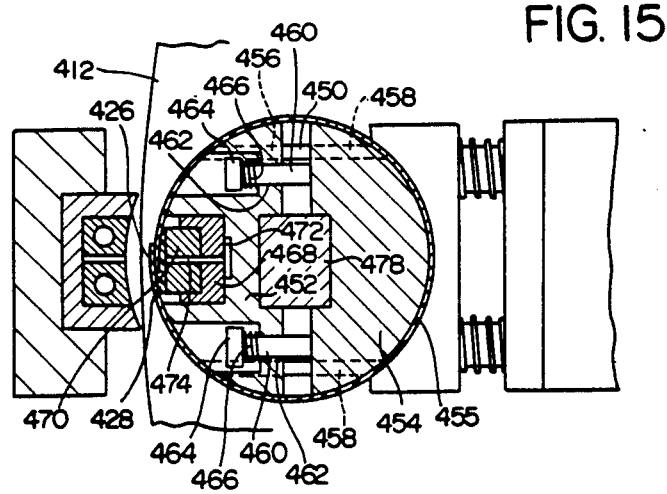
FIG. 15 is an enlarged partial sectional view of FIG. 13.

With reference to FIGS. 13 to 15, the fourth embodiment of the present invention will be described.

The apparatus shown in FIG. 13 comprises a fixed shaft 410, a disc-like rotating member (rotating plate) 412, an exterior stationary cam 414 (FIG. 14), six adhering devices 416, a heating device 418 and a cooling device 420.

The rotating member 412 is supported on a supporting member (not shown), for example an installation stand, so that it can rotate about the fixed shaft 410. The rotating member 412 is intermittently rotated by 60° by a driving device (not shown).

The exterior stationary cam 414 (FIG. 14) is disposed below the rotating member 412, and fixed to the aforesaid supporting member.

The six adhering devices 416 are fixed to the rotating member 412 at equiangular intervals. Each of the adhering devices 416 has a cam follower 422 (FIG. 14) to engage the surrounding stationary cam 414. The details of the adhering device 416 will be given hereinafter.

Each of the adhering devices 416 is successively held at a can body feed-in position at the bottom of FIG. 13, a heating position at the left bottom, a cooling position at the left top, a pressing-holding position at the top, a can body sending position at the right top and a transferring position at the right bottom by the intermittent driving of the rotating member 412. At the can body feed-in position at the bottom of FIG. 13, a can body 424 formed from a plate-like material by a welding device (not shown) is loaded into the bonding device 416 by a delivering device (not shown). At the heating position at the left bottom of FIG. 13, a heating device 418 heats the welded part 426 of the can body 424 and a tape-like resin 428 to be adhered to it. At the cooling position at the left top of FIG. 13, a cooling device 420 to be described below cools the welded part 426 and the tape-like resin 428. At the pressing-holding position at the top of FIG. 13, the tape-like resin 428 is maintained pressed against the welded part 426 of the can body 424. At the can body sending position at the right top of FIG. 13, the can body 424 is sent out from the adhering device 416 by a sending device (not shown). At the transferring position at the right bottom of FIG. 13, a roll-like or a sheet-like resin is cut into a tape form of a small width, or a roll of tape-like resin is cut to a fixed length, by a resin cutting and holding device (not shown), and the tape-like resin 428 is transferred to the adhering device 416.

The exterior stationary cam 414 (FIG. 14) holds the cam follower 422 at the top position of FIG. 14 (the position shown in FIG. 14) all the way from a position intermediate between the can body feed-in position and the heating position to a position intermediate between the pressing-holding position and the can body sending position through the heating position, the cooling position and the pressing-holding position, and at the bottom position in FIG. 14 from a position intermedaite between the pressing-holding position and the can body sending position to a position between the can body feed-in position and the heating position through the can body sending position, the transferring position and the can body feed-in position.

The heating device 418 includes a main body 430 fixed to a supporting member (not shown), for example an installation stand, and a heating portion 432 supported on the main body 430 so that it can move between a position at which it approaches the welded part 426 of the can body 424 loaded into the adhering device 416 held at the heating position and a position at which it is apart from the welded part 426. Various heating means can be used as the heating device 418. Preferably, it includes a high frequency heating coil 433 and heats the can body 424 without contact or heat the welded part while pressing it from outside.

The cooling device 420 serves to cool the tape-like resin 428 and the welded part 426 of the can body 424 in order to obtain a proper adhering between them. The cooling device 420 may, for example, be a device for supplying cooling water as shown, or a device (not shown) having a cooling bar to be in contact with the welded part 426 of the can body 424. The method of cooling by contacting the cooling bar with the welded part has an effect of shortening the cooling time as compared with the cooling operation in the first embodiment by the contacting of the cooled heating coil and the tape-like resin holding portion.

The adhering device 416 will now be described in detail with reference to FIGS. 14 and 15.

FIG. 14 shows the adhering device 416 at the heating position. The adhering device 416 is comprised of a mandrel supporting porition 434 fixed to the rotating member 412, a mandrel 436 supported on the mandrel supporting portion 434, the cam follower 422 adapted to engage the exterior stationary cam 414 to control the opening and closing of the mandrel 436, and a can guide 440 supporting the can body 424 together with the mandrel 436.

The mandrel supporting portion 434 includes a communication hole 442 communicating with a vacuum source (not shown) through a control device (not shown), a central hole 444 through which the cam follower 422 extends, a rail 446 for guiding the cam follower 422 so that it can move only longitudinally, and a guide rail 450 for guiding the mandrel 436 so that it can move only in the left-right directions in FIG. 14. The communication hole 422 is selectively caused to communicate with the atmosphere and the vacuum source by the control device.

The mandrel 436 has a mandrel body 452 and a opposing member 454 which respectively have grooves 456 and 458 for receiving the guide rail 450 provided in the upper part of the mandrel supporting portion 434. The mandrel 436 thus can move only in the left-right directions in FIG. 14 and not in the vertical direction, with respect to the mandrel supporting portion 434. Two guide pins 460 (FIG. 15) are fixedly provided in the opposing member 454, and extend through a hole 462 formed in the mandrel body 452. A compression spring 466 is disposed between a flange portion 464 of the guide pin 460 and the mandrel body 452. As a result, the mandrel body 452 and the opposing member 454 always undergo a force in a direction in which they approach each other. A tape holding portion securing plate 468 is fixed to the mandrel body 452, and a tape holding porition 470 is secured to the securing plate 468. A conduit hole 472 leading to the communication hole 442 is formed between the mandrel body 452 and the securing plate 468. A plurality of holding holes 474 communicating with the conduit hole 472 and with the outside are formed in the tape-holding portion 470 and the securing plate 468. Since the conduit hole 472 communicates with the communication hole 442 at any position of the mandrel body 452, the holding openings 474 are selectively caused to communicate with the vaccum source and the atmosphere by the control device (not shown). The tape-holding portion 470 is made of a material which has poor adhesion to the tape-like resin 428 (easily peels from it) proper elasticity which permits the fitting of the tape-like resin 428 with the welded part during pressurization, and has resistance to degradation on repeated heating, such as a silicone rubber or a fluorine-containing rubber. The tape holding portion 470 holds the tape-like resin 428 by the vacuum force of the holding openings 474.

The cam follower 422 includes an inclined plate 478, a rod 480 fixed to the inclined plate 478, a flange 482 provided at the end portion of the rod 480, a roller supporting portion 484 connected to the flange 482 and two rollers 486 and two fitting portions 488 provided in the side part of the roller supportring portion 484.

The inclined plate 478 is disposed between the mandrel body 452 and the opposing member 454, and by the vertical movement of the cam follower 422, the mandrel body 452 and the opposing member 454 are moved toward and away from each other. Instead of using the cam follower 422 and the inclined plate 478, the pressure of a fluid, such as a hydraulic pressure, may be used to move the mandrel body 452 and the opposing member 454. When the cam follower 422 is at the top position (the position shown in FIG. 14) and the mandrel body 452 is away fromn the opposing member 454, the outside surface of the opposing member 454 and the tape-like resin 428 held on the tape holding portion 470 are both kept in press contact with the inner circumferential surface of the can body 424. When the cam follower 422 is situated at the bottom position (not shown) and the mandrel body 452 is close to the opposing member 454, the outside surface 455 of the opposing member 454 and the tape-like resin 428 do not make contact with the inner circumferential surface of the can body 424.

The rod 480, as stated above, extends through the central hole 444 of the mandrel supporting portion 434, and a flange 482 is provided at the end portion of the rod 480. A compression spring 490 is disposed between the flange 482 and the mandrel supporting member 434, and always forces the cam follower 422 toward the bottom in FIG. 14.

A roller supporting portion 484 is connected to the underside of the flange 482, and two rotatable rollers 486 are provided on the roller supporting portion 484. The rollers 486 move the cam follower 422 up and down according to the shape of the exterior stationary cam 414. A fitting portion 488 adapted to engage the rail 446 of the mandrel supporting portion 434 is also provided in the roller supporting portion 484.

The can guide 440 includes a can guide supporting portion 492 fixed to the rotating member 412 and a guide portion 494. Four guide rods 496 are fixed to the guide portion 494. One end of each guide rod 496 is disposed in a hole 498 of the can guide supporting portion 492, and a flange portion 500 is formed. A shoulder portion 502 engaging the flange portion 500 of the guide rod 496 is formed in the hole 498 of the can guide supporting portion 492. As a result, the guide portion 494 can be set apart from the can guide supporting portion 492 within a restricted range. A compression spring 504 is disposed around the guide rod 496 and between the guide portion 494 and the can guide supporting portion 492, and forces the guide portion 494 in a direction away from the guide supporting portion 492. When the mandrel body 452 is close to the opposing member 454 but the can body 424 has not been loaded, the guide portion 494 comes into press contact with the outside surface 455 of the opposing member 454.

The fourth embodiment operates as follows:

First, at the transferring position at the right bottom of FIG. 13, the tape-like resin 428 is transferred from the transferring device to the tape holding portion 470 of the mandrel body 452 and thus held. At this position, the cam follower 422 is at the bottom position (not shown) of FIG. 14, and the mandrel body 452 approaches the opposing member 454. The holding holes 474 of the tape holding portion 470 communicate with the vacuum source, and by the vacuum force, the tape-like resin 428 is held by the tape holding portion 470.

Then, in the can body feed-in position, the mandrel body 452 is close to the opposing member 454, and the guide portion 494 is in contact with the outside surface 455 of the opposing member 454 with a relatively weak pressing force by the action of the compression spring 504. The cylindrically welded can body 424 is inserted by a delivering device (not shown) between the opposing member 454 and the guide portion 494 so as to surround the mandrel 452 and the opposing member 454. The can body 424 is held at a predetermined position by the pressing force of the compression spring 504 between the opposing member 454 and the guide portion 494.

During movement from the can body feed-in position and the heating position, the cam follower 422 is moved to the top position of FIG. 14 (the position shown in FIG. 14) by the exterior stationary cam 414 and the mandrel body 452 and the opposing member 454 move away from each other. Consequently, the tape-like resin 428 supported on the mandrel body 452 is brought into press contact with the inside surface of the welded part 426 of the can body 424, and the opposing member 454 applies a force opposing the pressing force to a part 506 opposing the welded part 426 of the can body 424.

At the heating position, the mandrel body 452 and the opposing member 454 are held apart from each other, and the tape-like resin 428 is in press contact with the welded part 426 of the can body 424. After the adhering device 416 has been held at the heating position, the heating portion 432 of the heating device 418 approaches the welded part 426 of the can body 424 to heat the welded part 426 and the tape-like resin 428. For efficient transmission of energy, the heating portion 432 is provided movably in the main body 430, and is adapted to approach the welded part 426 of the can body 424 as stated above.

At the cooling position, the tape-like resin 428 is maintained in press contact with the welded part 426 of the can body 424. The cooling device 420 cools the welded part of the can body 424 by, for example, blowing cold air against the welded part 426 or its vicinity. The desired temperature control can be effected by the cooling device 420 and the heating device 418.

At the pressing-holding position, the tape-like resin is maintained in press contact with the welded part 426 of the can body 424 for a predetermined period of time. To maintain the tape-like resin 428 in press contact with the welded part 426 is preferred because, for example, air remaining between the tape-like resin 428 and the inside surface of the welded part 426 can be discharged, and the adhesion strength between them can be increased.

During movement from the pressing-holding position to the can body sending position, the cam follower 422 is moved to the bottom position in FIG. 14 (not shown) by the exterior stationary cam 414, and the mandrel body 452 and the opposing member 454 move to a position where they approach each other. The holding openings 474 of the tape holding portion 470 of the mandrel body 452 are caused to communicate with the outer atmosphere. The tape-like resin 428 departs from the tape holding portion 470 and is maintained adhering to the welded part 426 of the can body 424. When the mandrel body 452 approaches the opposing member 454, the can body 424 is supported by the opposing member 454 and the guide portion 494.

At the can body sending position, the can body 424 having the tape-like resin 428 adhered to its welded part 426 is sent from the adhering device 416 by a sending device (not shown).

In the above embodiment, the rotating member 412 is intermittently driven by an angle of 60°. But the rotating member 412 can be constructed such that it is rotated continuously. When the rotating plate 412 is to be continuously rotated, the heating device 418 and the cooling device 420 are preferably provided such that they can each reciprocate along a predetermined arcuate track and the heating portion 432 of the heating device 418, and the heating device 418 and the cooling device 420 move along the aforesaid track so that the heating portion 432 of the heating device 418 or the cold air sending opening of the cooling device 420 are maintained in proximity to the welded part 426 of the moving can body 424 for a predetermined period of time. In the fourth embodiment, the adhering device can be simplified because the heating coil and the cooling means are provided independently of the adhering device on the rotating member. Hence, the rotating speed can be increased and the processing ability increases.

Fifth Embodiment

With refference to FIG. 16, the fifth embodiment of this invention will be described. The apparatus of the fifth embodiment differs from the apparatus of the fourth embodiment in that the opposing member 554 of the adhering device 516 is located outside the can body 524. Otherwise, its construction is the same.

Figure 16:
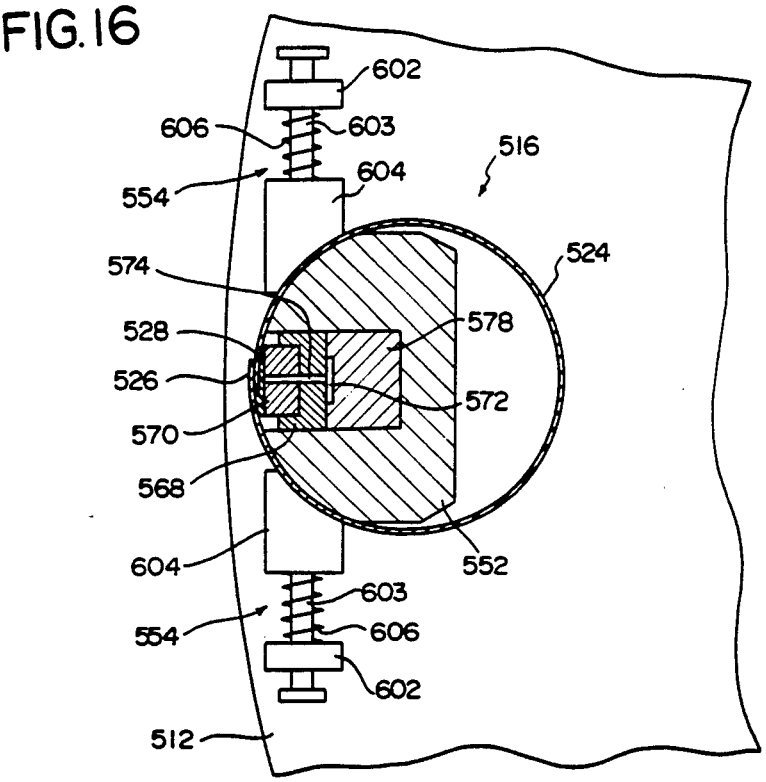
FIG. 16 is a view, similar to FIG. 15, of an apparatus in accordance with a fifth embodiment of the invention.

The adhering device 516 shown in FIG. 16 includes a mandrel body 552 fixed to the rotating member 512 and two opposing members 554 provided in the rotating member 512.

The mandrel body 552 supports an inclined plate 578 which makes a controlled movement in the longitudinally direction as does the inclined plate 478 of the cam follower 422 shown in FIG. 14. The mandrel body 552 is movable only in the left-right directions of FIG. 16, and supports a tape holding portion securing plate 568 and a tape holding portion 570 which are forced to the right in FIG. 16 by a compression spring (not shown). By the movement of the inclined plate 578, the tape holding portion securing plate 568 and the tape holding portion 570 are moved between a retracted first position (not shown) and a second position (the position shown in FIG. 16) at which a tape-like resin 528 held by the tape holding portion 570 is in press contact with the inside surface of the welded part 526 of the can body 524. Between the securing palte 568 and the inclined plate 578 is formed a conduit hole 572 communicating with a vacuum source (not shown) through a control device (not shown). A plurality of holding openings 574, same as in the fourth embodiment, are provided in the securing plate 568 and the tape holding portion 570.

Each of the resistance members 554 includes a supporting member 602 fixed to the rotating member 512, a press-contacting portion 604 disposed movably toward and away from the can body 24 disposed in the adhering device 516 and including a rod 603 extending through the hole of the supporting member 602, and a compression spring 506 disposed between the supporting member 602 and the press-contacting portion 604 for forcing the press-contacting portion 604 toward the can body 524.

The apparatus in accordance with the fifth embodiment operates as follows:

In the apparatus in accordance with the fifth embodiment, as in the apparatus in accordance with the fourth embodiment, the tape-like resin 528 is supported on the tape holding member 570 at the transferring position. At the transferring position, the securing plate 568 and the tape holding member 570 may be either at the first or second position mentioned above. The press-contacting portion 604 of the opposition member 554 is in press contact with the peripheral surface of the mandrel body 552.

At the can body feed-in position, the can body 524 is disposed and held between the mandrel body 552 and the press-contacting portion 604 of the opposing member 554. At this position, the securing plate 568 and the tape holding member 570 are at the retracted first position, and at the time of loading the can body 524, the can body 524 does not contact the tape-like resin 528 held by the tape holding member 570. The upper end portion (not shown) of the contact-pressing portion 604 is tapered as in the case of the upper end portion 608 (FIG. 14) of the guide portion in the fourth embodiment so as to permit easy insertion of the can body 524 into between the mandrel body 554 and the press-contacting part 604.

During the movement of the adhering device 516 from the can body feed-ion position to the heating position, the inclined plate 578 of the cam follower is moved upwardly, and the securing plate 568 and the tape holding member 570 move to the second position shown in FIG. 16 from the retracted first position (not shown). The tape-like resin 528 held by the tape holding member 570 is brought into press contact with the inside surface of the welded part 526 of the can body 524. The opposing member 554 provides a force opposing the press-contacting force.

At the heating position, the cooling position and the pressing-holding position, the can body 524 and the tape-like resin 528 are heated, cooled, pressed and held in the same way as in the fourth embodiment.

Between the pressing-holding position and the can body carrying position, the inclined plate 578 is lowered, and in the same way as in the fourth embodiment, the tape holding member 570 is moved away from the tape-like resin 528.

At the can body sending position, the can body 524 supported by the mandrel body 552 and the press-contacting portion 604 of the opposing member 554 is detached from the adhering device 516 by a sending device (not shown).

Sixth Embodiment

Figure 17:
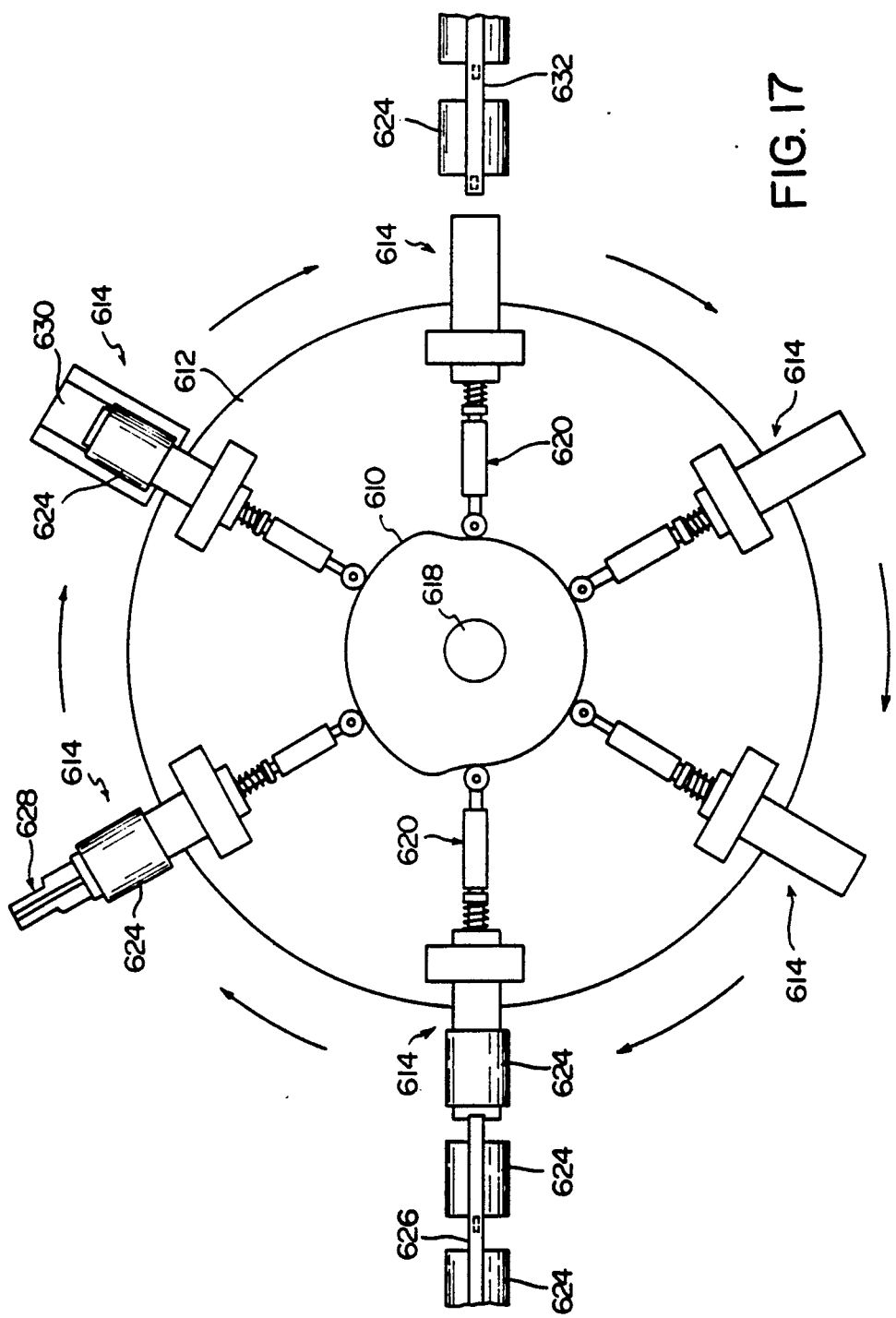
FIG. 17 is a top plan view of an apparatus in accordance with a sixth embodiment of the invention.

With reference to FIG. 17, the sixth embodiment of this invention will be described. The apparatus shown in FIG. 17 includes a central stationary cam 610, a disc-like rotating plate 612 and six adhering devices 614. FIG. 17 is a top plan view of this apparatus.

As in the first embodiment, the central stationary cam 610 is fixed to a fixed shaft 618. The periphery of the central stationary cam 610 is raised in an area of about one-third and depresssed in an area of about two-thirds, as shown in FIG. 17.

The rotating plate 612 is supported rotatably about the fixed shaft 618, and rotated intermittently by 60° by a driving device 614 (not shown).

The six adhering devices 614 are fixed to the rotating plate 612 at equiangular intervals, and each of the adhering devices 614 has a cam follower 620 engaging the central stationary cam 610. The adhering device 614 is provided with an expanding mechanism so that when the cam follower 620 moves longitudinally, the mandrel body and opposing member (not shown) expand outwardly to exert a tension on the entire inside surface of the can body 624 and at the same time, to press the tape-like resin on the tape holding portion (not shown) against the inside surface of the welded part of the can body 624. The expanding mechanism is shown in a simplified form in FIG. 17, but can be constructed of the same members as shown in FIGS. 13 and 14 such as the mandrel body 452, the opposing member 454, and the cam follower 422. If desired, a guide portion (not shown) functioning in the same way as the guide portion 494 in FIG. 14 may be provided.

The adhering device 614 is successively held at the following operating positions.

First, at the loading position on the left of FIG. 17, a can body 624 formed by a welding device (not shown) is loaded into the adhering device 614 by a delivering device 626. In FIG. 17, the can body is loaded so that its welded part faces downwardly. While it moves to the left top position in FIG. 17, the expanding mechanism acts and the tape-like resin is pressed against the inside surface of the welded part of the can body 624 through the tape holding portion.

Then, at the adhering position at the left top of FIG. 17, an electromagnetic energy is supplied through a high frequency heating coil 628 provided on a member different from the disc-like rotating plate 612, whereby the welded part of the can body 624 is heated to a predetermined temperature and the tape-like resin is pressed against the welded part and thus adhered. The high frequency heating coil 628 can be moved vertically, and is adapted to apply a pressure to the welded part from outside the can body 624. By pressing the tape-like resin against the welded part from its outside surface during heating, the tape-like resin flows and gets into the step of the welded part or its neighborhood to make the correction of the welded part more complete.

Then, at the cooling position at the right top of FIG. 17, a cooling member 630 provided on a member different from the disc-like rotating plate 612, as is the case with the high-frequency heating coil 628 contacts and presses the bonded part at the outside of the can body 624. Consequently, the temperature of the welded part is immediately lowered to solidify the tape-like resin.

During movement to the next carrying position, the expanding mechanism is set inoperative, and at the carrying position at the right in in FIG. 17, the can body 624 is carried away from the adhering device 614 by a carrying device 632.

Then, at the transferring position at the right bottom or left bottom of FIG. 17, the tape-like resin is placed on the tape-holding portion of the mandrel in the adhering device 614 by a transferring device (not shown).

In the sixth embodiment, unlike the first embodiment, the heating coil and the cooling member are provided on the member different from the disc-like rotating plate 612, do not have to turn round. Hence, they are not provided at positions opposite to the bonding device, and the apparatus is simplified. Consequently, its processing ability increases.

Furthermore, since the tape holding portion of the adhering device 614 faces downwardly, the apparatus does not require a complex mechanism of, for example, rotating the mandrel for tape transfer.

Seventh Embodiment

Figure 18:
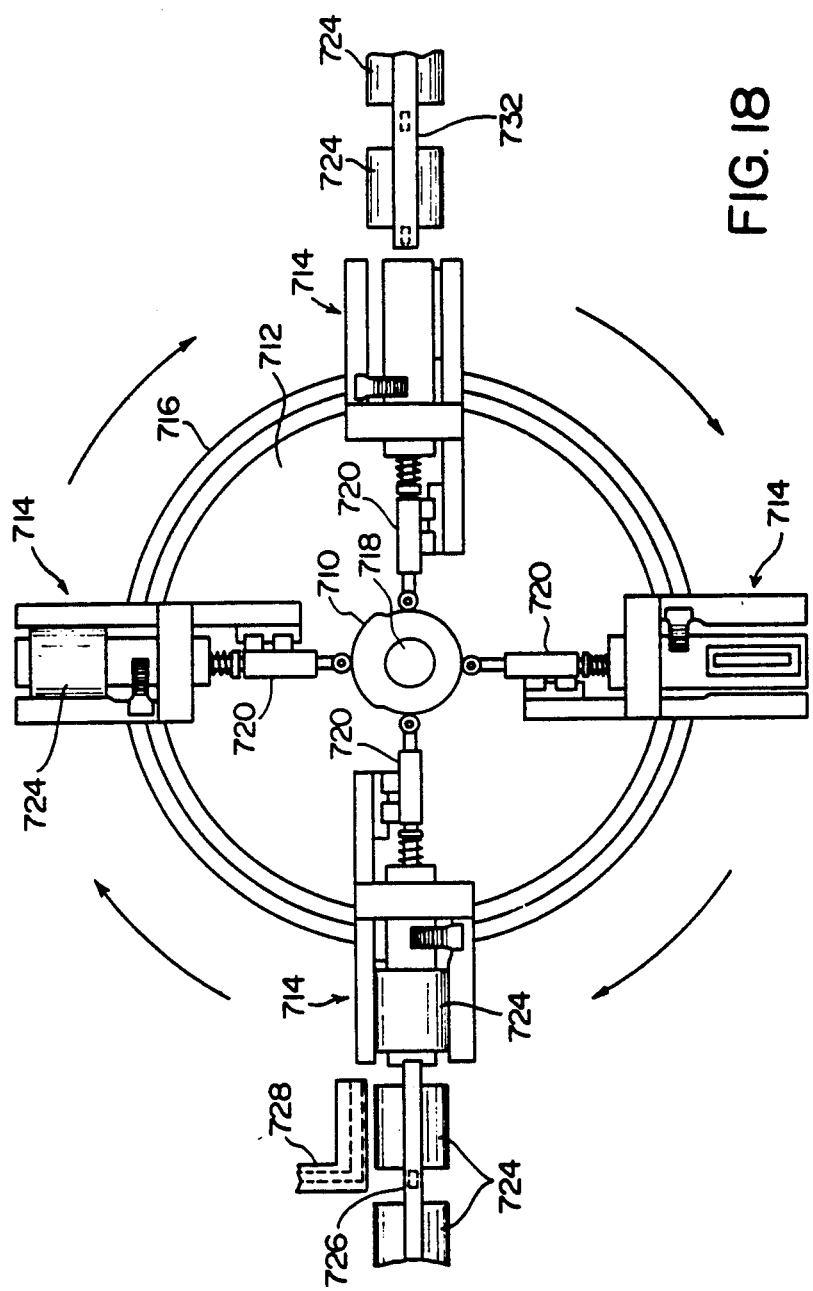
FIG. 18 is a top plan view of an apparatus in accordance with a seventh embodiment of the invention.

With reference to FIG. 18, the seventh embodiment of the present invention will be described.

(Construction)

Figure 19:
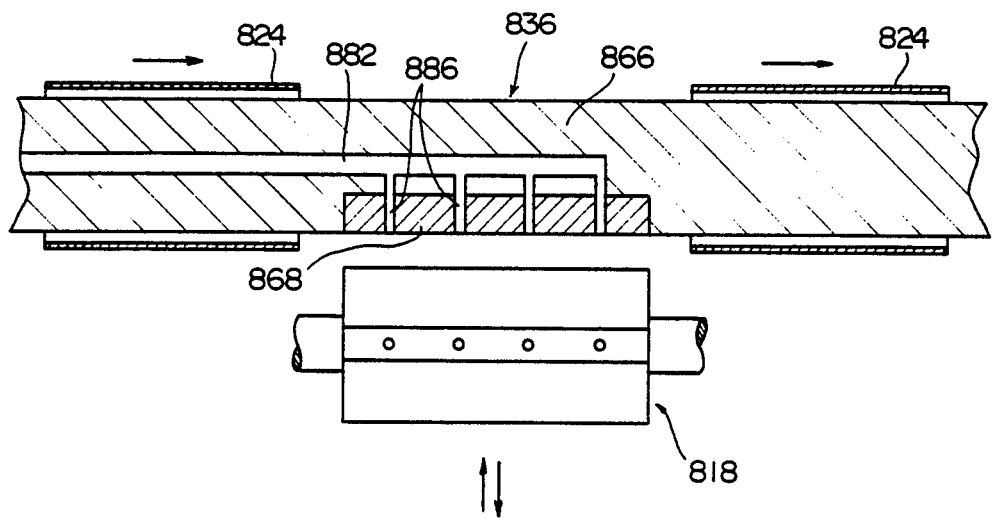
FIG. 19 is a side elevation, partially in section, of an apparatus in accordance with an eighth embodiment of the invention.

The apparatus shown in FIG. 19 functions in much the same way as the first embodiment, and includes a central stationary cam 710, a disc-like rotating plate 712, four adhering devices 714, and a cylindrical rib cam 716.

As in the first embodiment, the central stationary cam 710 is fixed to a fixed shaft 718.

The rotating plate 712 is supported so that it can rotate about the fixed shaft 718. It is intermittently rotated by 90° by a driving device (not shown).

The four adhering devices 714 are fixed to the rotating plate 712 at equiangular intervals. Each of the adhering devices 714 has a central stationary cam 710 and a cam follower 720 adapted to engage the central stationary cam 710. The adhering device 714 of the seventh embodiment is constructed nearly in the same way as in the adhering device 714 in the first embodiment, but unlike the latter, has no high frequency coil for heating (the secondary high requency coil 60 in FIG. 2).

First, at the left side position in FIG. 18, a can body 724 formed from a plate-like material by a welding device (not shown) is succesively sent to the right by a delivery device 726. An electromagnetic energy is supplied through a high frequency heating coil 728 provided separately from the adhering device 714, and the welded part of the can body 724 is heated.

Then, the can body 724 is loaded into the adhering device 714 by a delivery device 726. Thereafter, as soon as the adhering device 714 begins to rotate clockwise, the cam follower 720 moves as in the case of the first embodiment, and the holding portion holding a tape-like resin is pressed against the inside welded part of the can body 724, and the tape-like resin is adhered.

Then, at the sending position in the right side of FIG. 18, the can body 24 is carried from the adhering device 714 by a sending device 732.

Then, at the transferring position in at the bottom of FIG. 18, the tape-like resin is placed on the mandrel of the adhering device 714 by a transferring device (not shown).

In the seventh embodiment, the adhering device does not include a heating device. The can body is preheated by the high requency heating coil 728, and in the adhering device 714, the can body is merely held under pressure. Hence, the moving device is simplified, and the processing ability can be increased.

(Operating conditions)

Preferably, the seventh embodiment is operated under the following operating conditions.

First, in the heating step, the welded part of the welded can body 724 and its vicinity are heated uniformly to a temperature at least 100° C. above the softening point of the tape-like resin used, preferably 100° C.-200° C. above the softening temperature of the resin, more preferably 120°-180° C. above the softening temperature of the resin, by actuating the high frequency coil 728.

If the heating temperature at the welded part is lower than the softening point plus 100° C., a sufficient adhesion strength cannot be obtained. The tape will peel off during flanging, bead formation or seaming and the protection of the welded part and its vicinity becomes incomplete. On the other hand, when the heating temperature is higher than the softening point plus 200° C., disadvantages tend to occur such as the degradation of the protective coating, the discoloration of a printing ink, the exposing of metal at the corner of the stepped portion in the welded part, the formation of bubbles or the stretching or breaking of the film.

In the next pressing-cooling step, the holding portion holding the tape-like resin is pressed against the inside welded part of the pre-heated can body 724 under the conditions shown in the first embodiment the tape-like resin is cooled to a temperature below the softening temperature plus 25° C., preferably the softening temperature plus 5° C.

Eighth embodiment

Figure 20:
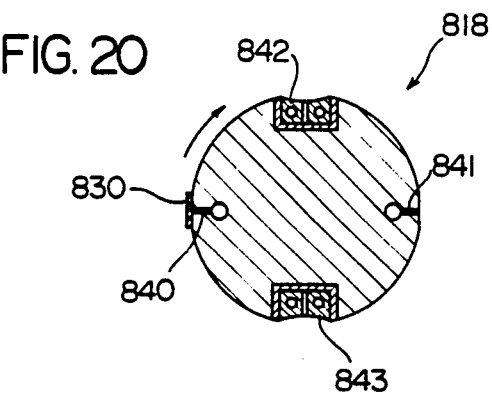
FIG. 20 is a vertical sectional view of part of the apparatus of FIG. 19.

With reference to FIGS. 19 and 20, the eighth embodiment of the present invention.

The apparatus shown in FIGS. 19 and 20 include a fixedly provided mandrel 836 and a transferring and heating roller 818.

Preferably, a welding device (not shown) is provided on the left (FIG. 19) of the mandrel 836 to form a metallic plate into cylindrical form successively and weld its side edge to form a can body 824. A holding portion 868 for holding a tape-like resin 830 is provided in the mandrel 836. A plurality of holding openings 886 are formed in the mandrel 836, and communicate with a vacuum source through a conduit hole 882 formed in the mandrel body 866. Can bodies 824 formed by the welding device (not shown) are intermittently moved to the right in FIG. 19 by a conveying device (not shown).

The transferring and heating roller 818 makes a controlled vertical position in FIG. 19 by a driving device (not shown), and rotates intermittently by 90°. In the transferring and heating roller 818, two holding portions 840 and 841 and two heating portions 842 and 843 having a known heating means are arranged alternately at equiangular intervals, as shown in FIG. 20 in section.

The eighth embodiment operates as follows:

First, the can body 824 is at a position shown in FIG. 19, and the transferring and heating roller 818 is at the rotating position shown in FIG. 20 and is apart from the mandrel 836. One holding portion 840 holds the tape-like resin 830 formed above with respect to the other embodiments by vacuum force. Then, the transferring and heating roller 818 rotates by 90°, and the holding portion 840 reaches a position opposing the holding portion 868 of the mandrel 836. The transferring and heating roller 818 rises slightly, and the upper surface of the tape-like resin 830 makes contact with the under surface of the holding portion 868 of the mandrel 836.

Thereafter, the communication of the holding holes 886 of the holding portion 868 of the mandrel 836 with the atmosphere is switched over to communication with a vacuum source, and the vacuum force of the holding portion 840 of the transferring and heating roller 818 is cancelled. As a result, the tape-like resin 830 is held by the holding portion 868 of the mandrel. Then, the transferring and heating roller 818 is moved slightly downwardly.

Then, by a conveying device (not shown), the can body 824 is moved to the right in FIG. 19, and the can body 824 on the right side of FIG. 19 is held at a predetermined position. At this position, the tape-like resin 830 opposes the entire length of the welded part of the can body 824. Simultaneously with this movement, the transferring and heating roller 818 rotates through 90° whereby the heating portion 842 of the heating roller arrives at a position opposing the welded part of the can body 824 and the tape-like resin 830 on its inside.

Thereafter, the transferring and heating roller 818 rises to press the welded part of the can body 824 and the tape-like resin 830 between the holding portion 868 of the mandrel 836 and the heating portion 842 of the heating roller 818 and to heat them. As a result, the tape-like resin 830 is adhered to the inside surface of the welded part of the can body 824.

When the temperature of the tape-like resin falls to a predetermined point, the transferring and heating roller 818 moves downwardly, and thereafter, the can body 824 having the tape-like resin 830 adhered thereto is moved to the position of the can body 824 shown in FIG. 19. The next can 824 is moved to the position of the left can body 824 in FIG. 10.

In the eighth embodiment, the mandrel 836 can be provided fixedly, and therefore, the structure of the apparatus as a whole can be relatively simplified.

Modified embodiments

The present invention is not limited to the above-described embodiments, and various changes, modifications and combinations are possible. Examples are shown below.

In the seventh embodiment, the welded part of the can body is heated and thereafter the welded part of the can body and the tape-like resin are pressed. In other embodiments, the welded part of the can body and the tape-like resin are pressed and then heated in the pressed state. If desired, it is possible to heat the welded part of the can body before pressurization, and further heat the welded part and the tape-like resin after pressurization. In an embodiment in which the heating is carried out before pressurization, the remaining heat during welding of the welded part of the can body can also be utilized.

In the first to seventh embodiments, the mandrel is provided on the rotating plate and rotates together with the rotating plate. In the eighth embodiment, the mandrel is fixedly provided. In a modified embodiment, the mandrel may be provided on a caterpillar moving along an elliptical track, and moved successively according to the movement of the caterpillar, and the various steps mentiond above are carried out. Alternatively it is possible to provide the mandrel on a reciprocating support, and to perform the various steps.

In the first embodiment, etc., the welded part of the can body and the tape-like resin are pressed by being held between a member (mandrel) inside the can body and a member (such as a heater) outside it. In the fourth embodiment, etc., the mandrel disposed inside the can body expands to press the tape-like resin against the welded part. If desired, as described in the sixth embodiment, the apparatus may be constructed such that the mandrel disposed inside the can body expands to press the tape-like resin against the welded part, and at the same time they are pressed by being held between a member outside the can body and a member (mandrel) inside the can body.

In the first to seventh embodiment, one can body is loaded into each member inside the can body. It is possible however to organic coat the welded parts of a plurality of (for example, two) welded can bodies with a tape-like resin by inserting the plurality of can bodies simultaneously into the member inside the can body.

In addition to the method of cutting the tape-like resin shown in the first embodiment, there are other methods, for example a method which comprises wrapping a sheet cut in advance to a length corresponding to the body length of a can body around a cutting roll, cutting it to a length corresponding to a predetermined coating width on the cutting roll, transferring it to a transferring roll, and transferring it to a holding portion for holding the tape-like resin; or a method which comprises winding a tape-like resin cut in advance to a length corresponding to a predetermined coating width around a bobbin or the like, unwinding the tape-like resin, successively cutting it to a length corresponding to the length of a welded can body by a cutter, transferring it to a transferrng roll, and then transfering it to a holding portion for holding the tape-like resin.

According to this invention, the time during which the welded part of the welded can body and its vicinity and the tape-like resin are in the pressed state can be varied. By bringing the temperature of the tape-like resin in this compressed state to a temperature at least 25° C. above the softening temperature, preferably at least 30° C. above the softening temperature, and immediately before the pressed state is cancelled, bringing the temperature of the tape-like resin to a point lower than the softening temperature plus 20° C., preferably a point lower than the softening temperature plus 5° C., the tape-like resin is not foamed and can fully fill the step in the welded part and be adhered to the welded can body with a good adhesion strength. By forcibly cooling rapidly the welded can body while the tape-like resin is maintained pressed against the welded can body, the tape-like resin can also be cooled rapidly. Hence, the time required for adhering the tape-like resin can be extremely shortened.

On the other hand, in the conventional adhering of a tape-like resin to a welded can body by means of a roll-like pressing member, the pressed state between the welded can boy and the tape-like resin by the roll lasts only instantaneously. Accordingly, it is extremely difficult to control the temperature of the tape-like resin accurately over the entire area to which the tape-like resin is adhered as in the present invention shown above. Specifically, bubbles forms in the tape-like resin at a part which has a temperature exceeding the softening temperature plus 20° C. immediately before the cancellation of the presssed state. On the other hand, at that part of the tape-like resin which has a temperature not exceeding the softening temperature plus 25° C. in the pressed state, the flowing of the tape-like resin is insufficient. Therefore, the resin cannot fully fill the step in the welded part, or its strength of adhesion to the metal surface is reduced.

The following examples illustrate the process of this invention more specifically.

EXAMPLES 1 to 3

A tin-free steel plate (electrolytically chromium-treated steel plate) having a thickness of 0.23 mm, except that part which was to become the side seam of a can body, was margin-coated with an epoxyphenolic paint so that after baking, the thickness of the coated film would become 5 micrometers on the inside surface and 3 micrometers on the outside surface. The coated film was baked and cured in a hot air drying oven at 205° C. for 10 minutes. Then, the coated plate was cut into a body blank (blank length 206.4 mm, blank height 104.5 mm) for a No. 7 can.

A welded can body (211 diameter, inner capacity 318.2 ml) was produced from the body blank by the welding method described in U.S. Pat. No. 4,334,138.

In an apparatus of the type shown in FIG. 18, a tape-like resin (two-layer polyester film; biaxially oriented PET/copolyester; the softening temperature of the adhesive layer 150° C.) having a thickness of 70 micrometers slit to a width of 8 mm and a length of 104 mm was set on the surface of a heat-resistant silicone rubber laminate bar having a thickness of 10 mm, a width of 10 mm and a length of 105 mm and provided with a rotating mandrel. The vicinity of the welded part of the welded can body was heated by a high frequency heating coil, and then the can body was mounted on the outside of the mandrel so that the welded part opposed the tape-like resin. By expanding the segment within the mandrel, a pressure was applied between the tape-like resin and the welded part at the inside surface of the welded can body. They were maintained in the pressed state until the temperature of the welded part dropped to a predetermined temperature. Thereafter, the presssed state was cancelled, and the vicinity of the welded part on the inside surface of the welded can body was protected with the tape-like resin. As coating conditions at this time, Table 1 shows the average heating temperature $\theta_1$ during the heating of the part to be organic coated, and the average cooling temperature $\theta_2$ at the time of releasing the pressure.

Then, the can body having its welded part covered and protected with the tape-like resin was taken out from the mandrel, and subjected to flanging and bead formation in a customary manner. A TFS bottom end for #211 diameter coated with an epoxyphenolic paint on both its inner and outside surfaces, followed by baking was attached to the can body by double seaming. Water-boiled salmon, tomato sauce, and 50% apple drink was filled in the resulting empty can, and a top end of the same specification was attached to the filled can by double seaming with a vacuum seaming machine.

The cans containing water-boiled salmon and tomato sauce were retorted at 118° C. for 90 minutes after filling. The 50% apple drink was heated to 90° C. before filling.

For each article filled, 100 sample cans were prepared and stored at 37° C. for 1 year.

The amount of hydrogen generated, the amount of dissolved iron, and hole formation were examined by an actual can test in accordance with the following methods of evaluation.

(Amount of dissolved iron)

This test was conducted only on the apple drink. After opening the can, all of the contents were reduced to ash. The ash was re-dissolved in hydrochloric acid. The supernatant was analyzed by atomic absorptiometry, and the amount of iron in the contents was measured. The arithmetic average per 10 cans was calculated.

(Amount of hydrogen generated)

This test was conducted on the tomato sauce. At the time of opening the can, gases in the can were collected, and the amount of hydrogen was examined by gas chromatography. The arithmetic average per 10 cans was calculated.

(Hole formation)

After the cans were stored for 1 year at 37° C. the cans were visually observed. Those cans which showed a leakage of liquid were opened, and the coated part near the welded part was observed. Those cans in which the formation of through-holes are classed as holed cans. The ratio of the number of the holed cans to the total number of cans tested was calculated. Furthermore, after the can opening, the coated part near the welded part was observed and its corroded state was examined. The total number of cans subjected to the storage test was 100 for each article, and arbitrarily extracted 10 cans were examined for the corroded state.

The results of the above tests are shown in Table 2. The test results show that according to the process of this invention, defects such as foaming of the tape-like resin were not seen and a very good protecting and covering condition can be obtained as compared with the roll pressing method shown in Comparative Examples 3 to 5 because the process of the invention is characterized in that after heating and pressurizing, the corrected part can be maintained in the pressed state until the temperature of the organic coated part drops.

Comparative Examples 1 and 2

By using the same apparatus, welded can bodies and tape-like resin as used in Examples 1 to 3, welded can bodies whose welded part at the inside surface was protected and covered with the tape-like resin were obtained by the same method as in Examples 1 to 3 except that the average heating temperature $\theta_1$ and the average cooling temperature $\theta_2$ at the time of releasing the maintained prsssure were changed as shown in Table 1.

The same articles as used in Examples 1 to 3 were respectively packed in the resulting can bodies, and stored at 37° C. for 1 year. Thereafter, the cans were evaluated in the same way. The test results are shown in Table 2.

The test results clearly show that when the temperature at the time of releasing the pressure exceeds the softening temperature of the adhesive layer of the tape-like resin plus 20° C., foaming of the tape-like resin after heat adhering occurs and the can body had inferior resistance to its contents.

Comparative Examples 3 to 5

The same welded can bodies as in Examples 1 to 3 were used, and the vicinity of the welded part of each of the welded cans was heated by a high frequency heating coil so that the average heating temperature $\theta_1$ of the welded part was as shown in Table 1. Then, the same tape-like resin as used in Examples 1 to 3 was slit to a width of 8 mm, and heat-adhered (adhering speed 20 m/min.) to the welded part at the inside surface of the preheated welded can body while it was pressed between a heat-resistant silicone rubber roll (outside diameter 30 mm—inner surface side) and a supporting roll (outer surface side). The average temperature $\theta_2$ of the coated part immediately after it left the silicone rubber roll was measured, and is shown in Table 1.

The same articles as in Examples 1 to 3 was packed respectively in the welded can bodies of Comparative Examples 3 to 5, and stored for 1 year at 37° C. Thereafter, the cans were evaluated in the same way as above. The test resutls are shown in Table 2.

The above test results clearly show that a method other than the process of this invention, for example the method involving roller pressing has the following disadvantages.

(i) When the temperature of the can body is raised to a point at which adhering is possible, the pressurizing time cannot be prolonged. Hence, the temperature of the can body immediately after releasing the pressure is too high so that foaming occurs in the resin to reduce the resistance of the can to the contents or cause discoloration of a finishing varnish applied to the outside surface of the can.

(ii) When adhering is carried out at a heating temperature at which foaming does not occur, the adhering becomes inferior. Hence, the resistance cf the can to its contents, and the processability of the can body become inferior.

EXAMPLE 4

In an apparatus of the type shown in FIG. 17, the same welded can bodies and tape-like resin as in Examples 1 to 3 were used, and the tape-like resin was set on the surface of a laminate bar in the same way as in Examples 1 to 3. Each of the welded can body was mounted on the outside of a mandrel having the laminate bar so that its welded part faces the tape-like resin. By expanding the segment within the mandrel, a pressure was applied between the tape-like resin and the welded part at the inside surface of the welded can body. Then, a vertically movable pressing member including a high-frequency heating coil built therein and disposed exteriorly of the can body and opposite to the welded part of the can body was moved so that a pressure would be applied between the tape-like resin on the mandrel and the welded part at the inside surface of the welded can body. By the high frequency heating coil provided in the pressing member, the part to be coated was heated to 250° C. (average heating temperature) over 0.5 second. The pressed state was maintained until the average temperature of the coated part dropped to 160° C. Thereafter, the pressed state was cancelled, and the vicinity of the welded part at the inside surface of the welded can body was protected and covered with the tape-like resin.

Then, the same articles as in Examples 1 to 3 were packed in the resulting can bodies, stored at 37° C. for 1 year, and evaluated in the same way. The test results are shown in Table 3.

The foregoing test results clearly show that by using the method in which the tape-like resin is adhered under heat to the welded part of the can body while the tape-like resin is pressed, (i) since a good adhesion strength can be obtained without heating the welded part to too high a temperature, such problems as the discoloration of a printing ink on the outside surface of the can body or the foaming of the tape-like resin do not arise;

(ii) since as compared with the method comprising pre-heating the welded part and then contacting under pressure, there is no period of time of cooling after heating the can, variations in the adhering temperature are small (within 50° C.), and the coated state becomes stable.

EXAMPLES 5 and 6

A tin plate having a thickness of 0.23 mm and containing 2.8 g/m² of tin plated excepting that site which was to be the side seam of a can body, was margin-coated with an epoxyphenolic paint so that the thickness of the coated film after baking would become 5 micrometers at inside surface and 3 micrometers at the outside surface, and the coated film was baked and cured in a hot air drying oven at 205° C. for 10 minutes. The coated plate was cut into a body blank for a No. 7 can.

By using a commercial seam welding machine, the body blank was formed into a cylindrical shape by a roll former and a welded can body for a No. 7 can was obtained.

In an apparatus of the type shown in FIG. 17, a tape-like resin (copolyester film, softening temperature 150° C.) having a thickness of 50 micrometers and slit to a width of 8 mm and a length of 104 mm was set on the surface of a heat-resistant silicone rubber laminate bar having a thickness of 10 mm, a width of 10 mm and a length of 105 mm provided within a rotating mandrel, and the welded can body was mounted on the outside of the mandrel so that the welded part of the welded can body opposed the tape-like resin. By expanding the segment within the mandrel, a pressure was applied between the tape-like resin and the welded part at the inside surface of the can body. The mandrel having the can body mounted on its outside was rotated, and a vertically movable pressing member including a high frequency heating coil built therein and disposed exteriorly of the can body and opposite to the side seam portion was pressed against the welded part. At the same time, the welded part was heated for 0.3 second so that the average heating temperature of the coated part became 250° C. in Example 5 and 175° C. in Example 6 by varying the amount of the electric current flowing through the high frequency heating coil. The mandrel was further rotated, and a cooling member disposed exteriorly of the can body and opposite to the welded part was contacted with the heated coated part for 0.2 second to cool the coated part forcibly. When the coated part was cooled to a predetermined temperature, the segment was contracted to cancel the pressed state, and the welded can body was taken out from the mandrel. The average cooling temperature at the time of releasing the pressure was adjusted to 160° C. in Example 5 and 130° C. in Example 6.

The welded can body in which the vicinity of the welded part on the inner surface side was protected and covered with the tape-like resin was subjected to flanging and bead formation, and a tin plate bottom end for #211 diameter which was coated with an epoxyphenolic paint on both inner and outside surfaces, followed by baking, was attached to the can body by double seaming. Each of the same articles as in Examples 1 to 3 was packed into the resulting empty can. The packed cans were stored at 37° C. for 1 year, and evaluated in the same way as above. The test results are shown in Table 3.

The above test results clearly show that when the welded part is cooled forcibly by the process of this invention after heating, the cooling is completed within a very short period of time, and can bodies having excellent covering property can be produced with a high efficiency.

TABLE 1

| | Coating conditions | | State of the part coated | | |
|---|---|---|---|---|---|
| | $\theta_1$ (°C.) | $\theta_2$ (°C.) | Foams | Flanged portion | Bead portion |
| Example 1 | 320 | 150 | None | No change | No change |
| Example 2 | 280 | 160 | " | " | " |
| Example 3 | 280 | 130 | " | " | " |
| Comp. Example 1 | 320 | 230 | Almost entirely foamed | Film broken at the foamed part | Film broken at the foamed part |
| Comp. Example 2 | 300 | 190 | Partly foamed | Film broken at the foamed part | Film broken at the foamed part |
| Comp. Example 3 | 400 | 330 | Entirely foamed | Film broken at the foamed part | Film broken at the foamed part |
| Comp. Example 4 | 270 | 200 | Partly foamed | Film broken at the foamed part | Film broken at the foamed part |
| Comp. Example 5 | 230 | 170 | None | Entirely peeled | Partly peeled |

TABLE 2

| | Contents | | | | | | | | |
|---|---|---|---|---|---|---|---|---|---|
| | Water-boiled salmon | | | Tomato sauce | | | Apple drink | | |
| | Test item | | | | | | | | |
| | Amount of hydrogen generated (ml/can) | State of the welded part inside the can | Number of holed cans | Amount of hydrogen generated (ml/can) | State of the welded part inside the can | Number of holed cans | Amount of dissolved iron (ppm) | State of the welded part inside the can | Number of holed cans |
| Example 1 | 0.04 | No change | 0 | 0.08 | No change | 0 | 0.5 | No change | 0 |
| Example 2 | 0.05 | " | 0 | 0.06 | " | 0 | 0.6 | " | 0 |
| Example 3 | 0.08 | " | 0 | 0.09 | " | 0 | 0.8 | " | 0 |
| Comp. Example 1 | 0.12 | Party blackened | 0 | 0.29 | Party pitted | 0 | 3.8 | " | 0 |
| Comp. Example 2 | 0.09 | Party blackened | 0 | 0.31 | Party pitted | 0 | 5.3 | Partly pitted | 0 |
| Comp. Example 3 | 0.16 | Party blackened | 0 | Swollen cans | Almost entirely pitted | 1 | 9.8 | Almost entirely pitted | 0 |
| Comp. Example 4 | 0.32 | Almost entirely blackened | 0 | Swollen cans | Almost entirely pitted | 3 | 11.5 | Almost entirely pitted | 0 |

TABLE 3

| | Contents | | | | | | | | |
|---|---|---|---|---|---|---|---|---|---|
| | Water-boiled salmon | | | Tomato sauce | | | Apple drink | | |
| | Test item | | | | | | | | |
| | Amount of hydrogen generated (ml/can) | State of the welded part inside the can | Number of holed cans | Amount of hydrogen generated (ml/can) | State of the welded part inside the can | Number of holed cans | Amount of dissolved iron (ppm) | State of the welded part inside the can | Number of holed cans |
| Example 4 | 0.02 | No change | 0 | 0.08 | No change | 0 | 0.5 | No change | 0 |
| Example 5 | 0.08 | " | 0 | 0.19 | " | 0 | 3.4 | " | 0 |
| Example 6 | 0.06 | " | 0 | 0.21 | " | 0 | 4.2 | " | 0 |

INDUSTRIAL UTILIZABILITY

The process and apparatus for producing a welded can body having an organic coated welded part can be used to produce can bodies for canning foods, juices, etc.

We claim:

1. A process for producing a welded can body having an organic coated welded part, which comprises a loading step of loading a welded can body on a mandrel having a groove formed in a contacting portion; an adhering step of bringing the contacting portion of the mandrel into contact with the inner wall of the welded can body, forming the desired sealed space by the inside surface of the welded part and its vicinity to be organic coated and the groove of the mandrel and injecting a molten resin into the sealed space thereby to adhere the resulting tape-like resin to the welded part of the can body; and a separating step of separating the welded can body from the mandrel.

2. An apparatus for producing a welded can body having an organic coated welded part, comprising a rotatably provided rotating plate and a plurality of adhering devices fixed to the rotating plate, each of the adhering devices having a mandrel to be disposed within a can body loaded into the adhering device, said mandrel including a holding portion for holding a tape-like resin, and said holding portion being disposed such that it can move between a position at which it approaches the inside surface of the can body loaded in the adhering device and a position at which it is apart from said inside surface.

3. The apparatus set forth in claim 2 wherein each of the adhering devices includes a cam follower adapted to engage a stationary cam, and said holding portion is moved between said approaching position and said spaced-apart position by the cam follower.

4. The apparatus set forth in claim 2 wherein the holding portion includes a blade portion for cutting a sheet-like resin into a tape-like resin in cooperation with a blade portion of a cutter.

5. An apparatus for producing a welded can body having an organic coated welded part, comprising a rotating plate provided rotatably on a supporting member, a plurality of adhering devices provided on the rotating plate, each of the adhering devices including a holding member for holding an organic coating material, a pressing member for pressing the organic coating material held by the holding member against the welded part of the can body and an opposing member for exerting a force opposing the pressurzing force by the pressing member, said apparatus further comprising a temperature adjusting device provided on the supporting member independently from the rotating plate for adjusting the temperature of the organic coating material.

6. The apparatus set forth in claim 5 wherein the holding member is a mandrel disposed inside the can body.

7. The apparatus set forth in claim 5 wherein the holding member is a holding member disposed exteriorly of the can body.

8. The apparatus set forth in claim 5 wherein the opposing member is contiguous to the inside surface of the can body and opposes the pressing force to be exerted by the pressing member via the holding member and the coating resin.

9. The apparatus set forth in claim 8 wherein the opposing member is contiguous to the outside surface of the can body and opposes the pressing force to be exerted by the pressing member via the holding member and the coating resin.

10. The apparatus set forth in claim 5 wherein the pressing member includes an inclined plate which comes into sliding contact with one surface of the holding member.

11. The apparatus set forth in claim 5 wherein the pressing member includes a fluid pressure device.

12. A process for producing a welded can body having a covered welded part wherein a tape-like resin is thermally adhered to the welded part of the welded can body and its vicinity, which comprises
 a step of heating the welded part of the welded can body and its vicinity,
 a step of, while the tape-like resin is pressed against the welded can body, conducting heat from the welded can body to the tape-like resin to heat the tape-like resin to such a temperature that the resin can flow well, simultaneously allowing the tape-like resin to flow along the welded part of the welded can body to deform the tape-like resin, and adhering the tape-like resin to the welded can body, and
 a step of, after adhering the tape-like resin to the welded can body, maintaining the pressed state between the welded can body and the tape-like resin until the tape-like resin is cooled below such a temperature that the resin does not substantially expand.

13. The process set forth in claim 12 wherein the welded part of the welded can body and its vicinity are heated and subsequently the tape-like resin is pressed against the heated welded can body and the heat is conducted from the welded can body to the tape-like resin to thereby heat the tape-like resin.

14. The process set forth in claim 12 wherein the welded can body against which the tape-like resin is pressed is heated to thereby heat the tape-like resin.

15. The process set forth in claim 12 wherein, while the tape-like resin is pressed against the interior of the welded part of the welded can body, a temperature of the tape-like resin is set at a point at least 25° C. above the softening temperature of the tape-like resin, and the tape-like resin is cooled to a temperature below the softening temperature of the tape-like resin plus 20° C. while maintaining the pressed state.

* * * * *